(12) United States Patent
Hisakado et al.

(10) Patent No.: US 8,368,858 B2
(45) Date of Patent: Feb. 5, 2013

(54) OPTICAL FILM, POLARIZING PLATE, AND VA-MODE LIQUID CRYSTAL DISPLAY DEVICE

(75) Inventors: Yoshiaki Hisakado, Minami-ashigara (JP); Takuya Inoue, Miniami-ashigara (JP); Shigeaki Nimura, Minami-ashigara (JP); Yasuyuki Sasada, Minami-ashigara (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 713 days.

(21) Appl. No.: 12/556,004

(22) Filed: Sep. 9, 2009

(65) Prior Publication Data
US 2010/0066948 A1    Mar. 18, 2010

(30) Foreign Application Priority Data
Sep. 10, 2008   (JP) ................ 2008-231812

(51) Int. Cl.
*G02F 1/1335* (2006.01)
(52) U.S. Cl. .................................. 349/117; 349/96
(58) Field of Classification Search .............. 349/96, 349/117
See application file for complete search history.

(56) References Cited

U.S. PATENT DOCUMENTS

| 5,583,679 A | 12/1996 | Ito et al. |
| 2004/0239852 A1 | 12/2004 | Ono et al. |
| 2006/0132686 A1 | 6/2006 | Jeon et al. |
| 2008/0204644 A1* | 8/2008 | Toyama et al. ............... 349/118 |
| 2009/0099308 A1* | 4/2009 | Takebe et al. .............. 525/54.21 |
| 2009/0122235 A1 | 5/2009 | Aminaka et al. |

FOREIGN PATENT DOCUMENTS

| JP | 2587398 B2 | 3/1997 |
| JP | 3648240 B2 | 5/2005 |
| JP | 2007-140497 A | 6/2007 |
| JP | 2008-023917 A | 2/2008 |
| WO | WO 2004/068226 A1 | 8/2004 |

OTHER PUBLICATIONS

Office Action from the Japan Patent Office dated Oct. 2, 2012 in corresponding Japanese Patent Application No. 2008-231812, with English translation thereof.

* cited by examiner

*Primary Examiner* — Wen-Ying P Chen
(74) *Attorney, Agent, or Firm* — Buchanan Ingersoll & Rooney PC

(57) ABSTRACT

The present invention relates to an optical film produced by stretching a film having a low residual solvent amount in a machine direction followed by heat-treating it at a temperature falling from the glass transition point (Tg) to the melting point (Tm) thereof, which is a cellulose acylate film satisfying the following relations (1) to (6) and containing at least one cellulose acylate and at least one retardation enhancer having an absorption maximum wavelength λmax of from 280 nm to 380 nm: (1) 35 nm$\leq$Re(550)$\leq$75 nm, (2) 85 nm$\leq$Rth(550)$\leq$140 nm, (3) 0 nm<ΔRe(630−450)$\leq$40 nm, (4) −75 nm$\leq$ΔRth(630−450)<0 nm, (5) 2.7$\leq$A+B$\leq$3.0, and (6) B$\geq$0, wherein "A" means a degree of substitution with an acetyl group of said at least one cellulose acylate, and "B" means a degree of substitution with an acyl group having at least 3 carbon atoms thereof.

8 Claims, 3 Drawing Sheets

OPTICAL FILM, POLARIZING PLATE, AND VA-MODE LIQUID CRYSTAL DISPLAY DEVICE

CROSS-REFERENCE TO RELATED APPLICATIONS

This application claims benefit of priority under 35 U.S.C. 119 to Japanese Patent Application No. 2008-231812, filed on Sep. 10, 2008, which is expressly incorporated herein by reference in its entirety.

BACKGROUND OF THE INVENTION

1. Technical Field

The present invention relates to an optical film and a polarizing plate contributing toward optical compensation in VA-mode liquid-crystal display devices, and to a liquid-crystal display device comprising it.

2. Background Art

Applications of liquid-crystal display devices are expanding year by year as power-saving and space-saving image display devices. Heretofore, one serious defect of liquid-crystal display devices is that the viewing angle dependence of image is large. Recently, however, various types of wide viewing angle-mode liquid-crystal display devices where the liquid-crystal molecules in the liquid-crystal cell align in the different manner from the previous one have been put into practical use, and in that situation, the demand for liquid-crystal display devices is rapidly expanding even in the market such as the TV market which require wide viewing angle characteristics.

In general, a liquid-crystal display device comprises a liquid-crystal cell, an optical compensation film and a polarizing element. The optical compensation film acts to solve the problem of color shift and to widen viewing angles, for which used is a stretched birefringent film or a film produced by coating a transparent film with a liquid crystal. For example, Japanese Patent No. 2587398 discloses a technique of applying an optical compensation film produced by applying a discotic liquid crystal onto a triacetyl cellulose film and aligning and fixing their molecules thereon, to a TN-mode liquid-crystal cell to thereby widen the viewing angle of the device. However, for liquid-crystal display devices for TV applications that are expected to be watched at various angles on large panels, the demand for reducing the viewing angle dependence y is serious, and even the above-mentioned technique could not satisfy the requirement. Accordingly, other modes of liquid-crystal display devices differing from TN-mode devices, for example, IPS (in-plane switching)-mode, OCB (optically compensatory bend)-mode or VA (vertically aligned)-mode devices are now under investigation.

In particular, VA-mode devices have a high contrast and their producibility is relatively good, and therefore VA-mode devices are specifically noted for liquid-crystal display devices for TV applications. However, VA-mode devices have a problem in that, though they can provide almost complete black states in the direction along the normal line relative to the panel plane, light leakage may occur in watching the panel in oblique directions, and therefore the viewing angle is narrow.

To solve the problem, a technique is reported, which comprises suitably designing the relationship between the Re value and the Rth value of the polarizing plate-protective film on the side of the liquid-crystal cell and Δnd of the liquid-crystal cell to fall within a controlled range, and suitably designing the coloration level in an orthogonal disposition of polarizing elements as well as the color temperature of the backlight in the liquid-crystal display devices to fall within a controlled range, thereby widening the viewing angle and reducing the color shift in the black state (for example, see JP-A 2007-140497). In addition, also reported is another technique comprising disposing a retardation film between a liquid-crystal cell and a polarizing film, controlling the wavelength dispersion characteristics of the retardation film, and using a plurality of specific retardation films as combined, thereby providing almost colorless black states with little light leakage throughout the entire visible light region (for example, see Japanese Patent No. 3648240). In addition, WO2004/068226 proposes a technique of using a retardation film having reversed wavelength dispersion characteristics of Re and having regular wavelength dispersion characteristics of Rth, but not using plural retardation films as combined, thereby providing almost colorless black states; however, any concrete means for realizing the technique is not provided.

SUMMARY OF THE INVENTION

One object of the invention is to provide an optical film of which retardation and wavelength dispersion characteristics are designed to fall within a range suitable for optical compensation for VA-mode liquid-crystal display devices, and a polarizing plate comprising the optical film as a protective film; and to provide a VA-mode liquid-crystal display device comprising the film or the polarizing plate, in which the light leakage and the color shift in oblique directions in the black state are thereby reduced.

The means for achieving the above mentioned object are as follows.

[1] An optical film produced by stretching a film having a low residual solvent amount in a machine direction followed by heat-treating it at a temperature falling from the glass transition point (Tg) to the melting point (Tm) thereof, which is a cellulose acylate film satisfying the following relations (1) to (6) and containing at least one cellulose acylate and at least one retardation enhancer having an absorption maximum wavelength λmax of from 280 nm to 380 nm:

$$35 \text{ nm} \leq Re(550) \leq 75 \text{ nm}, \tag{1}$$

$$85 \text{ nm} \leq Rth(550) \leq 140 \text{ nm}, \tag{2}$$

$$0 \text{ nm} < \Delta Re(630-450) \leq 40 \text{ nm}, \tag{3}$$

$$-75 \text{ nm} \leq \Delta Rth(630-450) < 0 \text{ nm}, \tag{4}$$

$$2.7 \leq A+B \leq 3.0, \tag{5}$$

$$B \geq 0, \tag{6}$$

wherein $Re(\lambda)$ means a value of retardation in plane at a wavelength of $\lambda$ nm; $Rth(\lambda)$ means a value of retardation along the thickness direction at a wavelength of $\lambda$ nm; $\Delta Re(\lambda_1-\lambda_2)$ means $Re(\lambda_1)-Re(\lambda_2)$ (provided that $\lambda_1 > \lambda_2$); $\Delta Rth(\lambda_1-\lambda_2)$ means $Rth(\lambda_1)-Rth(\lambda_2)$ (provided that $\lambda_1 > \lambda_2$); "A" means a degree of substitution with an acetyl group of said at least one cellulose acylate, and "B" means a degree of substitution with an acyl group having at least 3 carbon atoms thereof.

[2] The optical film of [1], which is stretched in the machine direction at a stretching ratio of less than 45%.

[3] The optical film of [1], which is stretched in the machine direction at a stretching ratio of from 7% to 30%.

[4] The optical film of [1], which is stretched in the machine direction at a stretching ratio of from 15% to 25%.

[5] The optical film of any one of [1] to [4], which satisfies the following formulae (1)' to (4)':

$$45\text{ nm} \leq Re(550) \leq 70\text{ nm},\quad (1)'$$

$$90\text{ nm} \leq Rth(550) \leq 130\text{ nm},\quad (2)'$$

$$3\text{ nm} < \Delta Re(630-450) \leq 30\text{ nm},\quad (3)'$$

$$-50\text{ nm} \leq \Delta Rth(630-450) < -10\text{ nm}.\quad (4)'$$

[6] The optical film of any one of [1] to [5], which satisfies the following formulae (1)" to (4)":

$$50\text{ nm} \leq Re(550) \leq 65\text{ nm},\quad (1)''$$

$$95\text{ nm} \leq Rth(550) \leq 125\text{ nm},\quad (2)''$$

$$5\text{ nm} < \Delta Re(630-450) \leq 20\text{ nm},\quad (3)''$$

$$-35\text{ nm} \leq \Delta Rth(630-450) < -25\text{ nm}.\quad (4)''$$

[7] A polarizing plate comprising a polarizing element and an optical film of any one of [1] to [6].

[8] A VA-mode liquid-crystal display device comprising two polarizing plates and a liquid-crystal cell disposed between them, wherein at least one of the two polarizing plates is a polarizing plate of [7].

[9] A process of preparing a cellulose acylate film comprising:

preparing a solution comprising at least one cellulose acylate film satisfying the following relations (5) and (6), and at least one retardation enhancer having an absorption maximum wavelength λmax of from 280 nm to 380 nm;

casting the solution onto a support to form a film thereon;

stretching the thus-formed film having a low residual solvent amount in the machine direction;

heating the stretched film at a temperature falling between the glass transition point (Tg) and the melting point (Tm) thereof, thereby producing a cellulose acylate film:

$$2.7 \leq A+B \leq 3.0,\quad (5)$$

$$B \geq 0\quad (6)$$

wherein A is a degree of substitution with an acetyl group of at least one cellulose acylate; and B is a degree of substitution with an acyl group having at least 3 carbon atoms thereof.

According to the invention, it is possible to provide an optical film of which retardation and wavelength dispersion characteristics are designed to fall within a range suitable for optical compensation for VA-mode liquid-crystal display devices, and a polarizing plate comprising the optical film as a protective film; and to provide a VA-mode liquid-crystal display device comprising the film or the polarizing plate, in which the light leakage and the color shift in oblique directions in the black state are thereby reduced.

Figure 1:
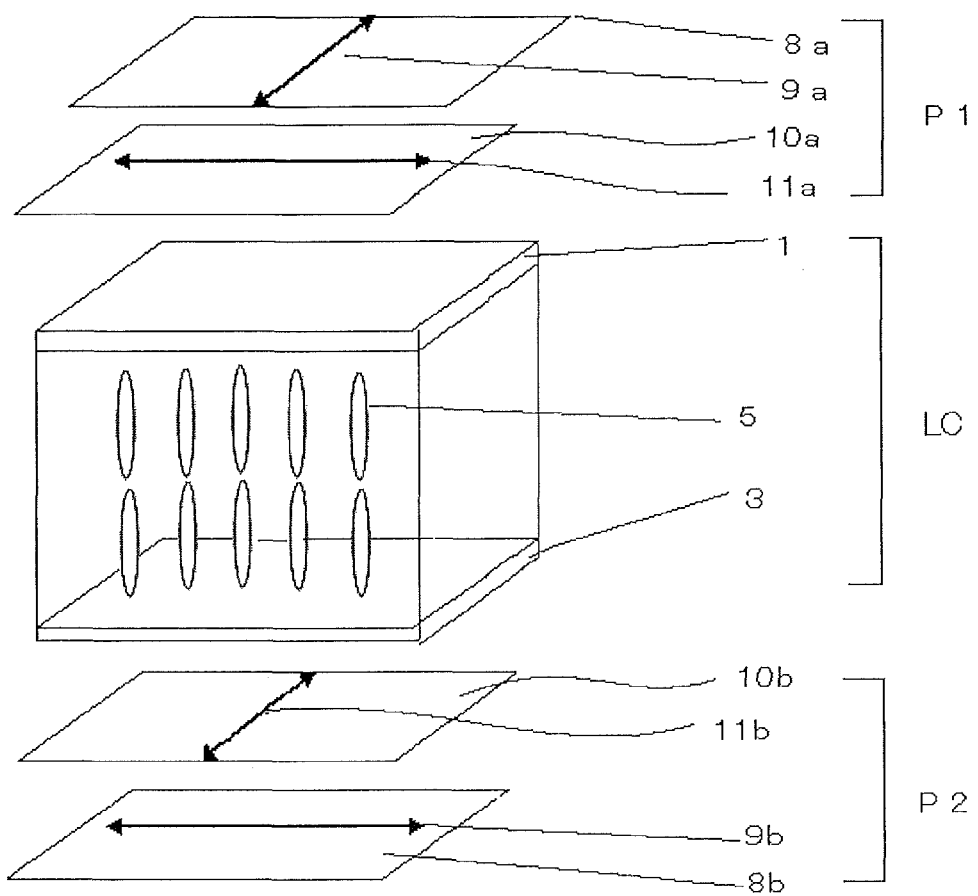
FIG. 1 is a schematic outline view of one example of a VA-mode liquid-crystal display device of the invention.

The meanings of the reference numerals and signs in the drawings are as follows:

1 Upper substrate of liquid-crystal cell
3 Lower substrate of liquid-crystal cell
5 Liquid-crystal layer (liquid-crystal molecules)
8a, 8b Polarizing film
9a, 9b Absorption axis of polarizing film
10a, 10b Protective film (optical film of the invention)
P1, P2 Polarizing plate
LC Liquid-crystal cell

DETAILED DESCRIPTION OF THE INVENTION

The invention is described in detail hereinunder. Note that, in this patent specification, any numerical expressions in a style of "numerical value 1 to numerical value 2" will be used to indicate a range including the lower and upper limits represented by the numeral values 1 and 2 given before and after "to", respectively.

At first, the meanings of the terms used in the description will be explained.

In this description, Re(λ) and Rth(λ) are retardation in plane (nm) and retardation along the thickness direction (nm), respectively, at a wavelength of λ. Re(λ) is measured by applying light having a wavelength of λ nm to a film in the normal direction of the film, using KOBRA 21ADH or WR (by Oji Scientific Instruments).

When a film to be analyze by a monoaxial or biaxial index ellipsoid, Rth(λ) of the film is calculated as follows.

Rth(λ) is calculated by KOBRA 21ADH or WR based on six Re(λ) values which are measured for incoming light of a wavelength λ nm in six directions which are decided by a 10° step rotation from 0° to 50° with respect to the normal direction of a sample film using an in-plane slow axis, which is decided by KOBRA 21ADH, as an inclination axis (a rotation axis; defined in an arbitrary in-plane direction if the film has no slow axis in plane); a value of hypothetical mean refractive index; and a value entered as a thickness value of the film.

In the above, when the film to be analyzed has a direction in which the retardation value is zero at a certain inclination angle, around the in-plane slow axis from the normal direction as the rotation axis, then the retardation value at the inclination angle larger than the inclination angle to give a zero retardation is changed to negative data, and then the Rth(λ) of the film is calculated by KOBRA 21ADH or WR.

Around the slow axis as the inclination angle (rotation angle) of the film (when the film does not have a slow axis, then its rotation axis may be in any in-plane direction of the film), the retardation values are measured in any desired inclined two directions, and based on the data, and the estimated value of the mean refractive index and the inputted film thickness value, Rth may be calculated according to the following formulae (X) and (XI):

$$Re(\theta) = \left[ nx - \frac{ny \times nz}{\sqrt{\left\{ ny\sin\left(\sin^{-1}\left(\frac{\sin(-\theta)}{nx}\right)\right)\right\}^2 + \left\{ nz\cos\left(\sin^{-1}\left(\frac{\sin(-\theta)}{nx}\right)\right)\right\}^2}} \right] \times \frac{d}{\cos\left\{\sin^{-1}\left(\frac{\sin(-\theta)}{nx}\right)\right\}} \quad (X)$$

$$Rth = \left[\frac{nx+ny}{2} - nz\right] \times d \quad (XI)$$

wherein Re(θ) represents a retardation value in the direction inclined by an angle θ from the normal direction; nx represents a refractive index in the in-plane slow axis direction; ny represents a refractive index in the in-plane direction perpendicular to nx; and nz represents a refractive index in the direction perpendicular to nx and ny. And "d" is a thickness of the sample.

When the film to be analyzed is not expressed by a monoaxial or biaxial index ellipsoid, or that is, when the film does not have an optical axis, then Rth(λ) of the film may be calculated as follows. The selectivity of the measurement wavelength λ nm may be conducted by a manual exchange of a wavelength-filter, a program conversion of a measurement wavelength value or the like.

Re(λ) of the film is measured around the slow axis (judged by KOBRA 21ADH or WR) as the in-plane inclination axis (rotation axis), relative to the normal direction of the film from −50 degrees up to +50 degrees at intervals of 10 degrees, in 11 points in all with a light having a wavelength of λ nm applied in the inclined direction; and based on the thus-measured retardation values, the estimated value of the mean refractive index and the inputted film thickness value, Rth(λ) of the film may be calculated by KOBRA 21ADH or WR.

In the above-described measurement, the hypothetical value of mean refractive index is available from values listed in catalogues of various optical films in Polymer Handbook (John Wiley & Sons, Inc.). Those having the mean refractive indices unknown can be measured using an Abbe refract meter. Mean refractive indices of some major optical films are listed below:

cellulose acylate (1.48), cycloolefin polymer (1.52), polycarbonate (1.59), polymethylmethacrylate (1.49) and polystyrene (1.59).

KOBRA 21ADH or WR calculates nx, ny and nz, upon enter of the hypothetical values of these mean refractive indices and the film thickness. Base on thus-calculated nx, ny and nz, Nz=(nx−nz)/(nx−ny) is further calculated.

In this description, "slow axis" of retardation films and others means the direction in which the refractive index is the largest. "Visible light region" means from 380 nm to 780 nm. Unless otherwise specifically indicated, the refractive index is one measured at λ=550 nm in the visible light region.

Also in this description, the numerical data, the numerical range and the qualitative expression (for example, "equivalent", "same", etc.) indicating the optical properties of constitutive components such as retardation film, liquid-crystal layer and others should be so interpreted as to indicate the numerical data, the numerical range and the qualitative expression that include the error range generally acceptable for liquid-crystal display devices and their constitutive components.

Also in this description, $\Delta Re(\lambda_1-\lambda_2)$ means $Re(\lambda_1)-Re(\lambda_2)$; $\Delta Rth(\lambda_1-\lambda_2)$ means $Rth(\lambda_1)-Rth(\lambda_2)$; and $\lambda_1 > \lambda_2$.

1. Optical Film:

The invention relates to an optical film which is a cellulose acylate film produced according to a predetermined method and satisfying the following relations (1) to (4):

$$35 \text{ nm} \leq Re(550) \leq 75 \text{ nm}, \quad (1)$$

$$85 \text{ nm} \leq Rth(550) \leq 140 \text{ nm}, \quad (2)$$

$$0 \text{ nm} < \Delta Re(630-450) \leq 40 \text{ nm}, \quad (3)$$

$$-75 \text{ nm} \leq \Delta Rth(630-450) < 0 \text{ nm}. \quad (4)$$

The optical film of the invention contributes toward reducing the light leakage and the color shift that may occur in oblique directions in the black state of a VA-mode liquid-crystal display device. More preferably, the optical film satisfies the following relations (1)' to (4)':

$$45 \text{ nm} \leq Re(550) \leq 70 \text{ nm}, \quad (1)'$$

$$90 \text{ nm} \leq Rth(550) \leq 130 \text{ nm}, \quad (2)'$$

$$3 \text{ nm} < \Delta Re(630-450) \leq 30 \text{ nm}, \quad (3)'$$

$$-50 \text{ nm} \leq \Delta Rth(630-450) < -10 \text{ nm}. \quad (4)'$$

Even more preferably, the optical film satisfies the following relations (1)' to (4)':

$$50 \text{ nm} \leq Re(550) \leq 65 \text{ nm}, \quad (1)'$$

$$95 \text{ nm} \leq Rth(550) \leq 125 \text{ nm}, \quad (2)'$$

$$5 \text{ nm} < \Delta Re(630-450) \leq 20 \text{ nm}, \quad (3)'$$

$$-35 \text{ nm} \leq \Delta Rth(630-450) < -25 \text{ nm}. \quad (4)'$$

Heretofore it is known that, when a biaxial optical film having reversed wavelength dispersion characteristics of Re and having regular wavelength dispersion characteristics of Rth is disposed in the top and the bottom of a VA-mode liquid-crystal cell as sandwiched therebetween, the constitution may reduce the light leakage and the color shift that may occur in oblique directions at the black state. However, it is not easy to make one film have the contradictory properties of reversed wavelength dispersion characteristics of Re and regular wavelength dispersion characteristics of Rth, and few concrete means for attaining it have been provided. Even if a film or the like having those wavelength dispersion characteristics of retardation could be obtained, it is not easy to make the film have Re and Rth falling within a preferred range. The present inventors have found that a cellulose acylate film produced according to a specific process of using a specific cellulose acylate(s) and a specific additive(s) as the starting materials can satisfy the above-mentioned characteristics, and have completed the present invention on the basis of this finding. According to the previous process, for preparing films reversed wavelength dispersion characteristics of Re and having regular wavelength dispersion characteristics of Rth, stretching in the direction orthogonal to the machine direction is carried out. According to the invention, the desired properties can be achieved by stretching a film in the machine direction.

The materials and the method for use in producing the optical film of the invention are described in detail hereinunder.

1.-1 Cellulose Acylate:

Cellulose acylate for use in producing the optical film of the invention is described.

The optical film of the invention comprises a cellulose acylate film containing a cellulose acylate as the main ingredient thereof. The wording "as the main ingredient" as referred to herein means as follows: When the film comprises a single polymer, the main ingredient is that polymer; and when the film comprises plural types of polymers, then the polymer having the highest mass fraction of those plural polymers is the main ingredient.

Cellulose acylate is an ester of a carboxylic acid with cellulose. In the cellulose acylate, all or a part of the hydrogen atoms of the hydroxyl groups existing in the 2-, 3- and 6-positions of the glucose unit constituting the cellulose are substituted with an acyl group. In the invention, used is a cellulose acylate of which the degree of substitution "A" with an acetyl group and the degree of substitution "B" with an acyl group having at least 3 carbon atoms satisfy the following relations (5) and (6):

$$2.7 \leq A+B \leq 3.0, \quad (5)$$

$$B \geq 0. \quad (6)$$

In case where the optical film of the invention contains two or more different types of cellulose acylates, the main ingredient cellulose acylate may satisfy the above-mentioned relations (5) and (6). More preferably, all the cellulose acylates constituting the optical film satisfy the formulae (5) and (6). The degrees of substitution, "A" and "B", may be calculated by measuring the amount of the bonding fatty acid per the constitutive unit mass of cellulose. The measurement may be attained according to "ASTM D817-91".

Using a cellulose acylate of which the degree of substitution "A" with an acetyl group (having 2 carbon atoms) and the degree of substitution "B" with an acyl group having at least 3 carbon atoms satisfy the above-mentioned relations (5) an (6), and stretching the film in the machine direction under a controlled condition to be mentioned below and heating it at a temperature falling within a predetermined range makes it possible to stably produce an optical film satisfying the above-mentioned relations (1) to (4). In addition, the glass transition point (Tg) and the crystallization point (Tc) of the film can be controlled, and the heating temperature for the film can be thereby controlled.

Preferably, the cellulose acylate for use in producing the optical film of the invention satisfies $2.88 \leq A+B \leq 3.0$, more preferably $2.89 \leq A+B \leq 2.99$, even more preferably $2.90 \leq A+B \leq 2.98$, still more preferably $2.92 \leq A+B \leq 2.97$.

Controlling the degree of substitution B makes it possible to adjust the humidity dependence of the retardation of the optical film of the invention. The humidity dependence of retardation is indicated by the retardation change in the film kept in an environment at a temperature of 25° C. and at a changing humidity of from 10% RH to 80% RH. When the retardation change is large, then there may occur a problem in that the variation in contrast of a liquid-crystal display device, which observed in oblique directions, is increased depending on surrounding environment. The humidity dependence of retardation may be reduced by increasing the degree of substitution B. The degree of substitution B is preferably from 0 to 0.9, more preferably from 0 to 0.7.

The number of carbons in the acyl group having 3 or more carbon atoms is preferably from 3 to 5, and more preferably 3 or 4. Examples of the acyl group having 3 or more carbon atoms include propionyl group, butyryl group, isobutyryl group, pivaloyl group, heptanoyl group, hexanoyl group, octanoyl group, decanoyl group, dodecanoyl group, tridecanoyl group, tetradecanoyl group, hexadecanoyl group, octadecanoyl group, cyclohexane carbonyl group, oleoyl group, benzoyl group, naphthyl carbonyl group, and cinnamoyl group. Preferred are propionyl group, butyryl group, dodecanoyl group, octanoyl group, pivaloyl group, oleoyl group, benzoyl group, naphthyl group and cinnamoyl group; and more preferred are propionyl group and butyryl group.

The cellulose acylate is preferably selected from the group consisting of cellulose acetate, cellulose acetate propionate and cellulose acetate propionate butyrate, satisfying the above mentioned relations (5) and (6).

The cellulose acylate to be use for preparing the optical film of the invention may be prepared according to the any known method.

Regarding a method for synthesizing cellulose acylate, its basic principle is described in *Wood Chemistry* by Nobuhiko Migita et al., pp. 180-190 (Kyoritsu Publishing, 1968). One typical method for synthesizing cellulose acylate is a liquid-phase acylation method with carboxylic acid anhydride-carboxylic acid-sulfuric acid catalyst. Concretely, a starting material for cellulose such as cotton linter or woody pulp is pretreated with a suitable amount of a carboxylic acid such as acetic acid, and then put into a previously-cooled acylation mixture for esterification to synthesize a complete cellulose acylate (in which the overall substitution degree of acyl group in the 2-, 3- and 6-positions is nearly 3.00). The acylation mixture generally includes a carboxylic acid serving as a solvent, a carboxylic acid anhydride serving as an esterifying agent, and sulfuric acid serving as a catalyst. In general, the amount of the carboxylic acid anhydride to be used in the process is stoichiometrically excessive over the overall amount of water existing in the cellulose that reacts with the carboxylic acid anhydride and that in the system.

Next, after the acylation, the excessive carboxylic acid anhydride still remaining in the system is hydrolyzed, for which, water or water-containing acetic acid is added to the system. Then, for partially neutralizing the esterification catalyst, an aqueous solution that contains a neutralizing agent (e.g., carbonate, acetate, hydroxide or oxide of calcium, magnesium, iron, aluminum or zinc) may be added thereto. Then, the resulting complete cellulose acylate is saponified and ripened by keeping it at 20 to 90° C. in the presence of a small amount of an acylation catalyst (generally, sulfuric acid remaining in the system), thereby converting it into a cellulose acylate having a desired substitution degree of acyl group and a desired polymerization degree. At the time when the desired cellulose acylate is obtained, the catalyst still remaining in the system is completely neutralized with the above-mentioned neutralizing agent; or the catalyst therein is not neutralized, and the cellulose acylate solution is put into water or diluted acetic acid (or water or diluted acetic acid is put into the cellulose acylate solution) to thereby separate the cellulose acylate, and thereafter this is washed and stabilized to obtain the intended product, cellulose acylate.

Preferably, the polymerization degree of the cellulose acylate is 150 to 500 as the viscosity-average polymerization degree thereof, more preferably 200 to 400, even more preferably 220 to 350. The viscosity-average polymerization degree may be measured according to a description of limiting viscosity method by Uda et al. (Kazuo Uda, Hideo Saito; *Journal of the Fiber Society of Japan*, vol. 18, No. 1, pp. 105-120, 1962). The method for measuring the viscosity-average polymerization degree is described also in JP-A-9-95538.

Cellulose acylate where the amount of low-molecular components is small may have a high mean molecular weight (polymerization degree), but its viscosity may be lower than that of ordinary cellulose acylate. Such cellulose acylate where the amount of low-molecular components is small may be obtained by removing low-molecular components from cellulose acylate synthesized in an ordinary method. The removal of low-molecular components may be attained by washing cellulose acylate with a suitable organic solvent. Cellulose acylate where the amount of low-molecular components is small may be obtained by synthesizing it. In case where cellulose acylate where the amount of low-molecular components is small is synthesized, it is desirable that the amount of the sulfuric acid catalyst in acylation is controlled to be 0.5 to 25 parts by mass relative to 100 parts by mass of cellulose. When the amount of the sulfuric acid catalyst is controlled to fall within the range, then cellulose acylate having a preferable molecular weight distribution (uniform molecular weight distribution) can be synthesized. The polymerization degree and the distribution of the molecular weight of the cellulose acylate can be measured by the gel penetration chromatography (GPC), etc.

The starting material, cotton for cellulose ester and methods for synthesizing it are described also in Hatsumei Kyokai Disclosure Bulletin (No. 2001-1745, issued on Mar. 15, 2001, Hatsumei Kyokai), pp. 7-12.

The cellulose acylate to be used as the starting material in producing the cellulose acylate film may be a powdery or granular one, or may also be pelletized one. The water content of the cellulose acylate to be used as the starting material is preferably equal to or less than 1.0% by mass, more preferably equal to or less than 0.7% by mass, most preferably equal to or less than 0.5% by mass. As the case may be, the water content is preferably equal to or less than 0.2% by mass. In case where the water content of the cellulose acylate is not within the preferred range, it is desirable that the cellulose acylate is dried with dry air or by heating and then used in the invention.

1.-2 Retardation Enhancer

The optical film of the invention contains at least one retardation enhancer along with at least one cellulose acylate. According to the invention, the retardation enhancer is selected from the compounds having an absorption maximum wavelength λmax of from 280 nm to 380 nm. It is noted that "retardation enhancer" is defined as follows. Retardation (Re, Rth) measured at a wavelength of 550 nm of a cellulose acylate film, containing an additive, is larger by 20 nm or more than that of another cellulose acylate film, not containing the additive, which is prepared in the same manner as the cellulose acylate film containing the additive, except that the additive is not added. Such an additive is defined as a retardation enhancer in the description.

The amount of the retardation enhancer is preferably from 0.01 to 20 parts by mass and more preferably from 0.1 to 10 parts by mass with respect to 100 parts mass of cellulose acylate. Two or more types of retardation enhancers may be used.

The retardation enhancer to be used in the invention has an absorption maximum wavelength λmax of from 280 nm to 380 nm, preferably from 300 to 380 nm, and more preferably from 330 to 370 nm. By adding the compound, having an absorption maximum wavelength λmax falling within the range, thereto and carrying out the stretching-step described later and the heating-treatment step, it is possible to stably prepare the optical film which satisfies the relations (1)-(4) and has high transparency without any coloration. The absorption maximum wavelength λmax of the optical film is preferably from 280 to 375 nm. For avoiding coloration of the film, it is preferable that the retardation enhancer to be used in the invention has no substantial absorption peak in the visible-light wavelength. It is also preferable that the retardation enhancer to be used in the invention is substantially not volatile during all of the process.

According to the invention, one type of the retardation enhancer may be used alone, or two or more types thereof may be used in combination. The amount of the retardation enhancer may be decided depending on the desired optical properties of the film, and is preferably from 2 to 20% by mass, more preferably from 4 to 15% by mass and even more preferably from 5 to 10% by mass. The retardation enhancer may be added to a melt or a cellulose acylate solution for forming films before carrying out the film formation.

The retardation enhancer to be used in the invention is preferably selected from the group consisting of the compounds represented by formulae (I)-(VI). The compounds represented by formula (I)-(V) are capable of not only enhancing retardation but also controlling retardation-dependency. The optical film satisfying the relations (1)-(4) can be prepared by using cellulose acylate added with the compound according to the process described later. Among the compounds represented by formulae (I)-(IV), the compounds represented by formulae (I), (II) and (III) are preferable; and the compounds represented by formula (I) are more preferable.

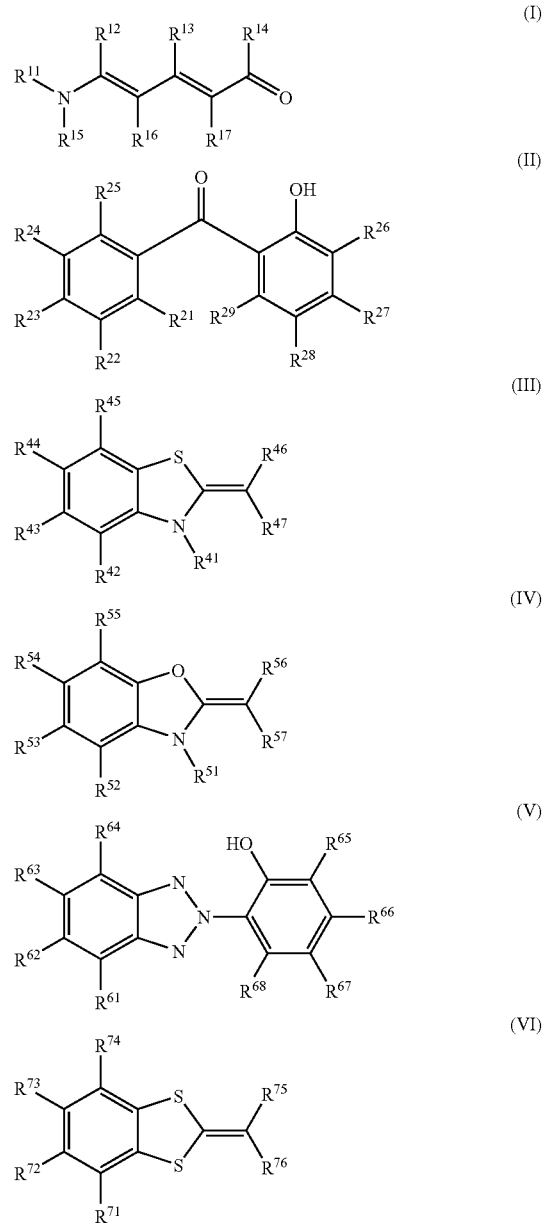

$R^{11}$, $R^{12}$, $R^{13}$, $R^{14}$, $R^{15}$, $R^{16}$, and $R^{17}$ in formula (I); $R^{21}$, $R^{22}$, $R^{23}$, $R^{24}$, $R^{25}$, $R^{26}$, $R^{27}$, $R^{28}$, and $R^{29}$ in formula (II); $R^{41}$, $R^{42}$, $R^{43}$, $R^{44}$, $R^{45}$, $R^{46}$, and $R^{47}$ in formula (III); $R^{51}$, $R^{52}$, $R^{53}$, $R^{54}$, $R^{55}$, $R^{56}$, and $R^{57}$ in formula (IV); $R^{61}$, $R^{62}$, $R^{63}$, $R^{64}$, $R^{65}$, $R^{66}$, $R^{67}$, and $R^{68}$ in formula (V); and $R^{71}$, $R^{72}$, $R^{73}$, $R^{74}$, $R^{75}$ and $R^{76}$ in formula (VI); each represent a hydrogen atom or a substituent group.

By selecting the type of the substitution group, the long axis of the molecule of the compound represented by any one of formulae (I)-(VI) may be adjusted to any direction. It is possible that the direction of the molecular long axis is adjusted to the horizontal direction of the paper plane.

Examples of the substituent group include halogen atoms such as fluorine atom, chlorine atom, bromine atom and iodine atom; substituted or non-substituted alkyls (preferably $C_{1-30}$, or more preferably $C_{1-10}$ substituted or non-substituted alkyls) such as methyl, ethyl, n-propyl, isopropyl, tert-butyl, n-octyl and 2-ethylhexyl; substituted or non-substituted cycloalkyls (preferably $C_{3-30}$ or more preferably $C_{3-10}$ substituted or non-substituted cycloalkyls) such as cyclohexyl, cyclopentyl and 4-n-dodecylcyclohexyl; substituted or non-substituted bicycloalkyls (preferably $C_{5-30}$ or more preferably $C_{5-10}$ substituted or non-substituted bicycloalkyls, that is, monovalent residues of preferably $C_{5-30}$ or more preferably $C_{5-10}$ substituted or non-substituted bicycloalkanes) such as bicyclo[1.2.2]heptane-2-yl, bicyclo[2.2.2]octane-3-yl; substituted or non-substituted alkenyls (preferably $C_{2-30}$ or more preferably substituted or non-substituted $C_{2-10}$ alkenyls) such as vinyl and allyl; substituted or non-substituted cycloalkenyls (preferably $C_{3-30}$ or more preferably $C_{3-10}$ substituted or non-substituted cycloalkenyls, that is, monovalent residues of preferably $C_{3-30}$ or more preferably $C_{3-10}$ substituted or non-substituted cycloalkenene) such as 2-cyclopentene-1-yl and 2-cyclohexene-1-yl; substituted or non-substituted bicycloalkenyls (preferably $C_{5-30}$ or more preferably $C_{5-10}$ substituted or non-substituted bicycloalkenyls, that is, monovalent residues of preferably $C_{5-30}$ or more preferably $C_{5-10}$ substituted or non-substituted bicycloalkenes) such as bicyclo[2.2.1]hepto-2-en-1-yl and bicyclo[2.2.2]octo-2-en-4-yl; substituted or non-substituted alkynyls (preferably $C_{2-30}$ or more preferably $C_{2-10}$ alkynyls) such as ethynyl and propargyl; substituted or non-substituted aryls (preferably $C_{6-30}$ or more preferably $C_{6-10}$ substituted or non-substituted aryls) such as phenyl, p-tolyl and naphthyl; substituted or non-substituted heterocyclic group (preferably monovalent residues of substituted or non-substituted 5- or 6-membered heterocyclic compounds; and preferably $C_{3-30}$ or more preferably $C_{3-10}$ substituted or non-substituted heterocyclic groups) such as 2-furyl, 2-thenyl, 2-primidyl and 2-benzothiazolyl; cyano; hydroxyl; nitro; carboxyl; substituted or non-substituted alkoxys (preferably $C_{1-30}$ or more preferably $C_{1-10}$ substituted or non-substituted alkoxys) such as methoxy, ethoxy, isopropoxy, tert-butoxy, n-octyloxy and 2-methoxyethoxy; substituted or non-substituted aryloxys (preferably $C_{6-30}$ or more preferably $C_{6-10}$ substituted or non-substituted aryloxys) such as phenoxy, 2-methylphenoxy, 4-tertbutylphenoxy, 3-nitrophenoxy, and 2-tetradecanoyl amino phenoxy; silyloxys (preferably $C_{3-20}$ or more preferably $C_{3-10}$ silyloxy) such as trimethyl silyloxy and tert-butyl dimethyl silyloxy; substituted or non-substituted heterocyclic oxy group (preferably $C_{2-30}$ or more preferably $C_{2-10}$ substituted or non-substituted heterocyclic oxy group) such as 1-phenyl tetrazole-5-oxy and 2-tetrahydro pyrenyl oxy; substituted or non-substituted acyloxys (preferably formyl oxy, or $C_{2-30}$ (or more preferably $C_{2-10}$) substituted or non-substituted alkylcarbonyls) such as formyl oxy, acetyl oxy, pivaloyl oxy, stearoyl oxy, benzoyl oxy and p-methoxy phenyl carbonyl oxy; substituted or non-substituted carbamoyl oxy group (preferably $C_{1-30}$ or more preferably $C_{1-10}$ substituted or non-substituted carbamoyl oxy group) such as N,N-dimethyl carbamoyl oxy, N,N-diethyl carbamoyl oxy, morpholino carbonyl oxy, N,N-di-n-octyl amino carbonyl oxy, and N-n-octyl carbamoyl oxy; substituted or non-substituted alkoxy carbonyl oxy group (preferably $C_{2-30}$ or more preferably $C_{2-10}$ substituted or non-substituted alkoxy carbonyl oxy group) such as methoxy carbonyl oxy, ethoxy carbonyl oxy, tert-butoxy carbonyl oxy and n-octyl carbonyl oxy; substituted or non-substituted aryloxy carbonyl oxy group (preferably $C_{7-30}$ or more preferably $C_{7-10}$ substituted or non-substituted aryloxy carbonyl oxy group) such as phenoxy carbonyl oxy, p-methoxy phenoxy carbonyl oxy and p-n-hexadecyloxy phenoxy carbonyl oxy; substituted or non-substituted aminos (preferably non-substituted amino, or $C_{1-30}$ (or more preferably $C_{1-10}$) substituted or non-substituted alkyl aminos) such as non-substituted amino, methylamino, dimethylamino, anilino, N-methyl-anilino and diphenyl amino; substituted or non-substituted acylamino group (preferably formyl amino, $C_{1-30}$ (or more preferably $C_{1-10}$) substituted or non-substituted alkyl carbonyl amino group, or $C_{6-30}$ (or more preferably $C_{6-10}$) substituted or non-substituted aryl carbonyl amino group) such as formyl amino, acetyl amino, pivaloyl amino, lauroyl amino and benzoyl amino; substituted or non-substituted amino carbonyl amino (preferably $C_{1-30}$ or more preferably $C_{1-10}$ substituted or non-substituted amino carbonyl amino group) such as carbamoyl amino, N,N-dimethyl amino carbonyl amino, N,N-diethyl amino carbonyl amino and morpholino carbonyl amino; substituted or non-substituted alkoxy carbonyl aminos (preferably $C_{2-30}$ or more preferably $C_{2-10}$ substituted or non-substituted alkoxy carbonyl aminos) such as methoxy carbonyl amino, ethoxy carbonyl amino, tert-butoxy carbonyl amino, n-octadecyl carbonyl amino and N-methyl-methoxy carbonyl amino; substituted or non-substituted aryloxy carbonyl amino group (preferably $C_{7-30}$ or more preferably $C_{7-10}$ substituted or non-substituted aryloxy carbonyl amino group) such as phenoxy carbonyl amino, p-chlorophenoxy carbonyl amino and m-n-octyloxyphenoxy carbonyl amino; substituted or non-substituted sulfamoyl group (preferably $C_{0-30}$ or more preferably $C_{0-10}$ substituted or non-substituted sulfamoyl group) such as non-substituted sulfamoyl, N,N-dimethyl amino sulfonylamino and N-n-octylamino sulfonylamino; substituted or non-substituted alkyl- and aryl-sulfonyl amino group (preferably $C_{1-30}$ or more preferably $C_{1-30}$ substituted or non-substituted alkyl sulfonylamino group; and preferably $C_{6-30}$ or more preferably $C_{6-10}$ substituted or non-substituted aryl sulfonylamino group) such as methyl sulfamoyl amino, butyl sulfamoyl amino, phenyl sulfamoyl amino, 2,3,5-trichlorophenyl sulfamoyl amino, and p-methylphenyl sulfamoyl amino; mercapto; substituted or non-substituted alkylthio group (preferably $C_{1-30}$ or more preferably $C_{1-30}$ substituted or non-substituted alkylthio group) such as methylthio, ethylthio and n-hexadecylthio), substituted or non-substituted arylthio group (preferably $C_{6-30}$ or more preferably $C_{6-10}$ substituted or non-substituted arylthio group) such as phenylthio, p-chlorophenylthio and m-methoxyphenylthio; substituted or non-substituted heterocyclic thio group (preferably $C_{2-30}$ or more preferably $C_{2-10}$ substituted or non-substituted heterocyclic thio group) such as 2-benzothazolyl thio and 1-phenyltetrazole-5-yl thio; substituted or non-substituted sulfamoyls (preferably $C_{0-30}$ or more preferably $C_{0-10}$ substituted or non-substituted sulfamoyls) such as N-ethylsulfamoyl, N-(3-dodecyloxy propyl)sulfamoyl, N,N-dimethylsulfamoyl, N-acetylsulfamoyl, N-benzoylsulfamoyl, and N—(N' phenylcarbamoyl)sulfamoyl; sulfo; substituted or non-substituted alkyl- and aryl-sulfinyls (preferably $C_{1-30}$ or more preferably $C_{1-10}$ substituted or non-substituted alkyl-sulfinyls; and preferably $C_{6-30}$ or more preferably $C_{6-10}$ substituted or non-substituted aryl-sulfinyls) such as methylsulfinyl, ethylsulfinyl, phenylsulfinyl and p-methylphenyl sulfinyl; substituted or non-substituted alkyl- and aryl-sulfonyls (preferably $C_{1-30}$ or more preferably $C_{1-10}$ substituted or non-substituted alkyl-sulfonyls; and preferably $C_{6-30}$ or more preferably $C_{6-10}$ substituted or non-substituted aryl-sulfonyls) such as methylsulfonyl, ethylsulfonyl, phenylsulfonyl, and p-methylphenylsulfonyl; substituted or non-substituted acyls (preferably formyl, $C_{2-30}$ (or more preferably $C_{2-10}$) substituted or non-substituted alkyl carbonyl group, or $C_{7-30}$ (or more preferably $C_{7-10}$) substituted or non-substituted aryl carbonyl group) such as acetyl and pivaloyl benzoyl; substituted or non-substituted aryloxy carbonyl group (preferably $C_{7-30}$ or more preferably $C_{7-10}$ substituted or non-substituted aryloxy carbonyl group) such as phenoxy carbonyl, o-chlorophenoxy carbonyl, m-nitrophenoxy carbonyl, and p-tert-butyl phenoxy carbonyl; substituted or non-substituted alkoxy carbonyl group (preferably $C_{2-30}$ or more preferably $C_{2-10}$ substituted or non-substituted alkoxy carbonyl group) such as methoxy carbonyl, ethoxy carbonyl, tert-butoxy carbonyl and n-octadecyloxy carbonyl; substituted or non-substituted carbamoyls (preferably $C_{1-30}$ or more preferably $C_{1-10}$ substituted or non-substituted carbamoyls) such as non-substituted carbamoyl, N-methyl carbamoyl, N,N-dimethyl carbamoyl, N,N-di-n-octyl carbamoyl, and N-(methylsulfonyl) carbamoyl; substituted or non-substituted aryl- and heterocyclic azo group (preferably $C_{6-30}$ or more preferably $C_{6-10}$ substituted or non-substituted arylazo group; and preferably $C_{3-30}$ or more preferably $C_{3-10}$ substituted or non-substituted heterocyclic azo group) such as phenyl azo, p-chlorophenyl azo and 5-ethylthio-1,3,4-thiadiazol-2-yl azo; substituted or non-substituted imido group such as N-succinimido and N-phthalimido; substituted or non-substituted phosphino group (preferably $C_{2-30}$ or more preferably $C_{2-10}$ substituted or non-substituted phosphino group) such as dimethyl phosphino, diphenyl phosphino and methylphenoxy phosphino; substituted or non-substituted phosphinyl group (preferably $C_{2-30}$ or more preferably $C_{2-10}$ substituted or non-substituted phosphinyl group) such as non-substituted phosphinyl, dioctyloxy phosphinyl and diethoxy phosphinyl; substituted or non-substituted phosphinyl oxy group (preferably $C_{2-30}$ or more preferably $C_{2-10}$ substituted or non-substituted phosphinyl oxy group) such as diphenoxy phosphinyl oxy and dioctyl oxy phosphinyl oxy; substituted or non-substituted phosphinyl amino group (preferably $C_{2-30}$ or more preferably $C_{2-10}$ substituted or non-substituted phosphinyl amino group) such as dimethoxy phosphinyl amino and dimethylamino phosphinyl amino; and silyl group (preferably $C_{3-30}$ or more preferably $C_{3-10}$ substituted or non-substituted silyl group) such as trimethyl silyl, tert-butylmethyl silyl and phenyl dimethyl silyl.

The substituents, which have at least one hydrogen atom, may be substituted by at least one substituent selected from these. Examples such substituent include alkylcarbonylaminosulfo, arylcarbonylaminosulfo, alkylsulfonylaminocarbonyl and arylsulfonylaminocarbonyl. More specifically, methylsulfonylaminocarbonyl, p-methylphenylsulfonylaminocarbonyl, acetylaminosulfonyl and benzoylaminosulfonyl are exemplified.

Among the examples described above, preferred are halogen atoms, alkyls, aryls, alkoxys, cyano, hydroxyl, carboxyls and arylsulfonyls; more preferred are alkyls, alkoxys, hydroxyl, carboxyls and phenylsulfonyls.

Same or different two or more substituents may be selected. If possible, the substituents may bond to each other to form a ring which includes a condensed ring with the ring in the formula).

The molecular-weight of the retardation enhancer to be used in the invention is preferably from 100 to 5000, more preferably from 150 to 3000, and even more preferably from 200 to 2000.

In place or in addition to the retardation enhancer, also having the ability of controlling wavelength dispersion characteristics, other retardation enhancers may be used. Examples of the other retardation enhancers include compounds having one or more aromatic ring therein; and preferably, the compounds have from 2 to 15 aromatic rings therein; and more preferably, the compounds have from 3 to 10 aromatic rings therein. It is preferable that each atom embedded in the compound other than the aromatic ring(s) is substantially located in the plane of the aromatic ring. Regarding the compounds having two or more aromatic rings, it is preferable that the rings are located substantially in the same plane. For enhancing Rth selectively, the additive in the film is preferably present so that the plane of the aromatic ring is parallel to the plane of the film.

1.-3 Plasticizer

The optical film of the invention preferably contains at least one plasticizer. The plasticizer to be used in the invention may have an ability of controlling retardation of the film. Hereinafter, examples of the plasticizer, having an ability of reducing Rth, will be described in detail. The amount of the plasticizer to be added to the film is preferably from 0.01 to 30% by mass, more preferably from 0.05 to 25% by mass and even more preferably from 0.1 to 20% by mass with respect to the total amount of the cellulose acylate material.

Examples of the plasticizer which can be used in the invention include those described in JP-A-2005-139304; and among those, the compound represented by formula (1) is preferable.

(1):

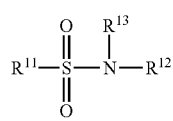

In formula (1), $R^{11}$ represents an alkyl or aryl group; and $R^{12}$ and $R^{13}$ each represent a hydrogen atom, alkyl or aryl. The total number of the carbon atoms in $R^{11}$, $R^{12}$ or $R^{13}$ is preferably equal to or more than 10. $R^{11}$, $R^{12}$ or $R^{13}$ may have at least one substituent group.

Examples of the substituent group include a fluorine atom, alkyl, aryl, alkoxy, sulfone and sulfonamido; and preferred are an alkyl, aryl, alkoxy, sulfone and sulfon-amido;

The alkyl may have a linear or branched chain structure or a cyclic structure; and preferred are $C_{1-25}$ alkyls, more preferred are $C_{6-25}$ and even more preferred are $C_{6-20}$ alkyls. Especially preferred are methyl, ethyl, propyl, isopropyl, butyl, isobutyl, t-butyl, amyl, isoamyl, t-amyl, hexyl, cyclohexyl, heptyl, octyl, bicyclooctyl, nonyl, adamantly, decyl, t-octyl, undecyl, dodecyl, tridecyl, tetradecyl, pentadecyl, hexadecyl, heptadecyl, octadecyl, nonadecyl and didecyl.

Regarding aryls, preferred are $C_{6-24}$ aryls, and especially preferred are phenyl, biphenyl, terphenyl, naphthyl, binaphthyl and triphenyl phenyl.

Examples of the compound represented by formula (1) include, but are not limited to, those shown below.

(101)

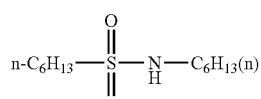

(102)

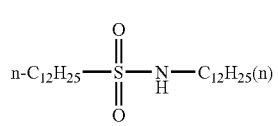

(103)

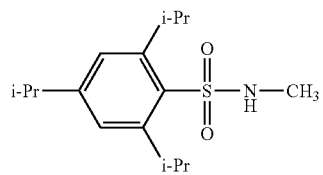

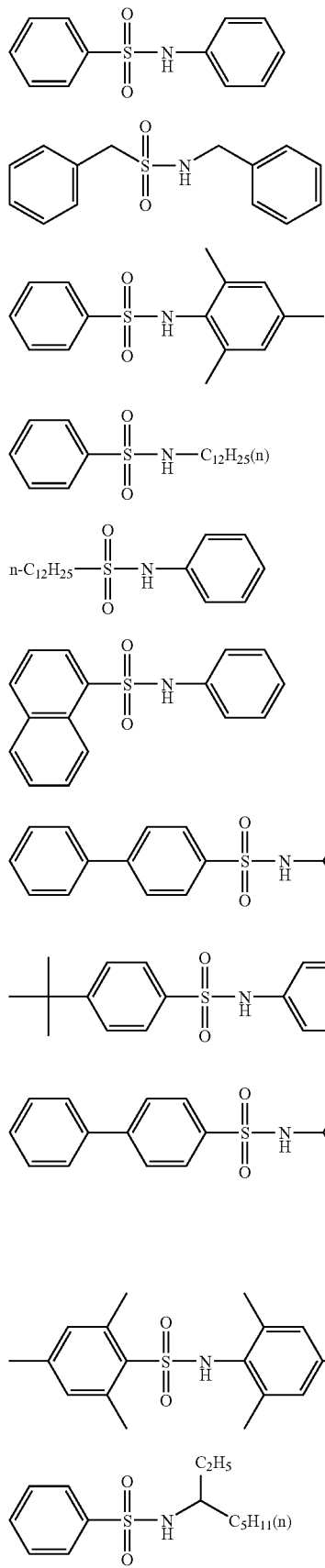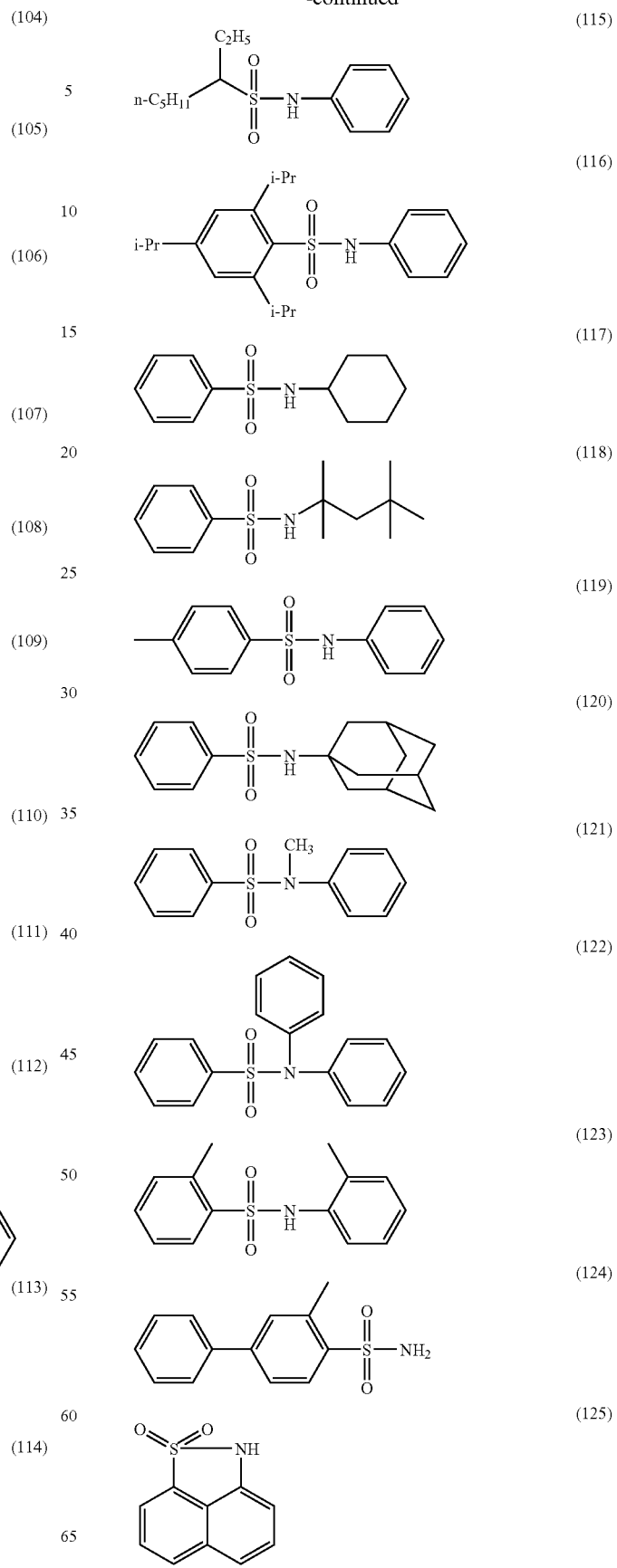

-continued
(126)
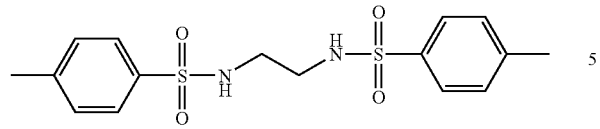
(127)
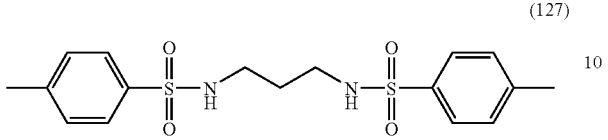
(128)
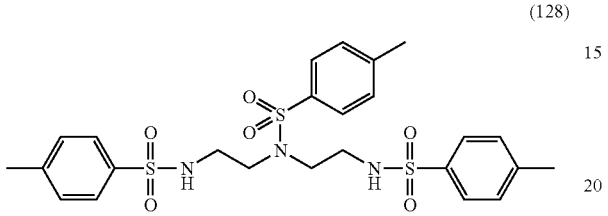
(129)
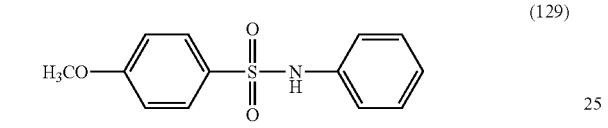
(130)
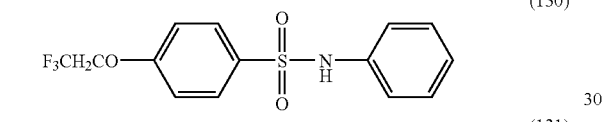
(131)
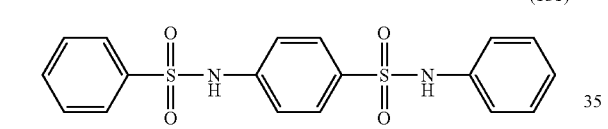
(132)
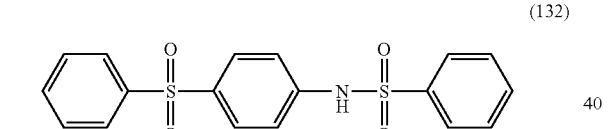
(133)
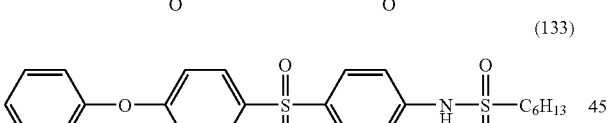
(134)
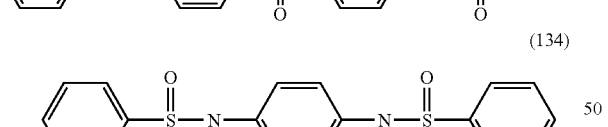
(135)
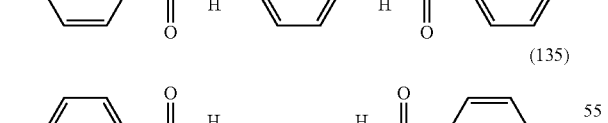
(136)
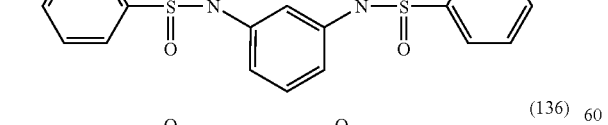
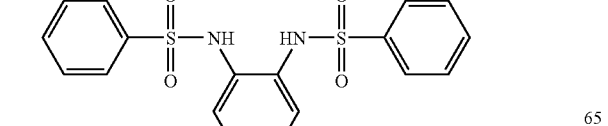
-continued
(137)
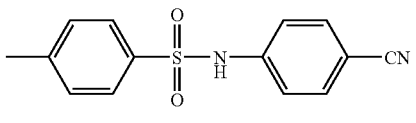
(138)
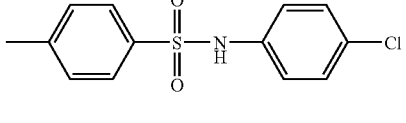
(139)
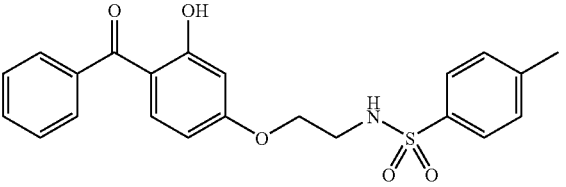
(140)
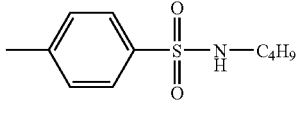
(141)
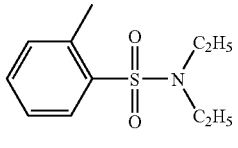
(142)
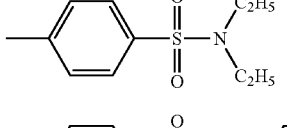
(143)
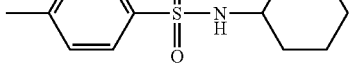
(144)
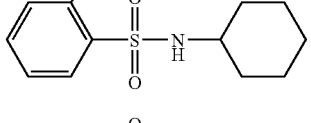
(145)
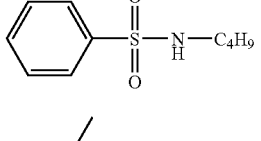
(146)
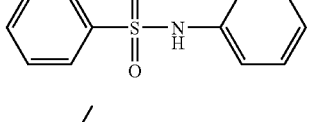
(147)
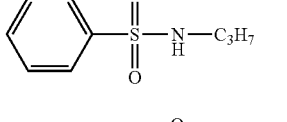
(148)
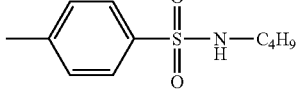

(149)
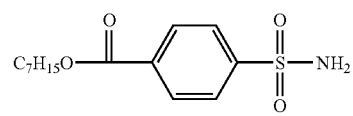

(150)
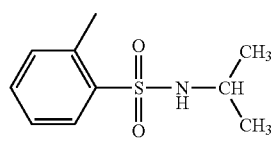

(151)
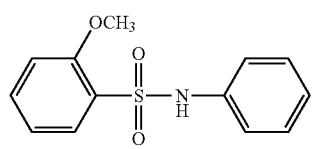

(152)
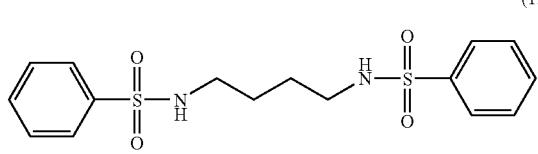

(153)
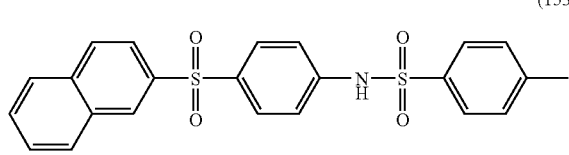

(154)
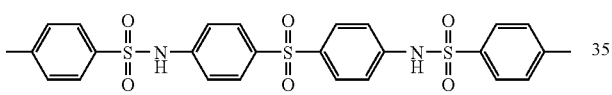

(155)
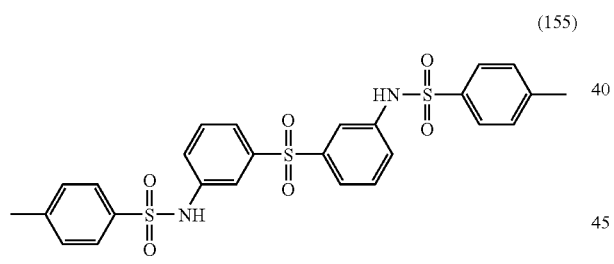

(156)
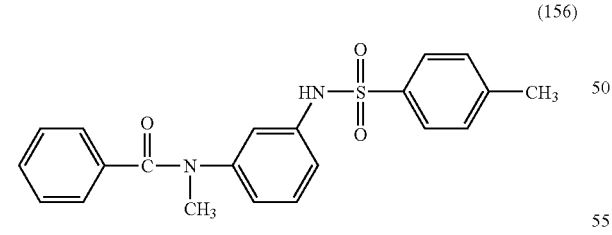

(157)
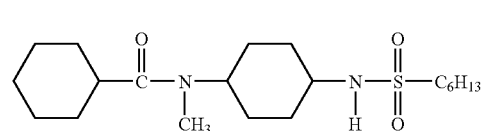

(158)
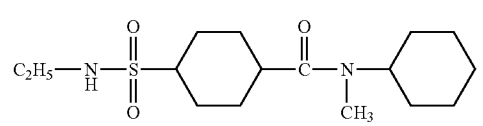

(159)
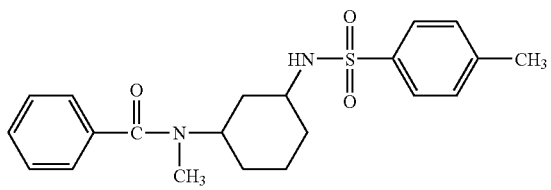

(160)
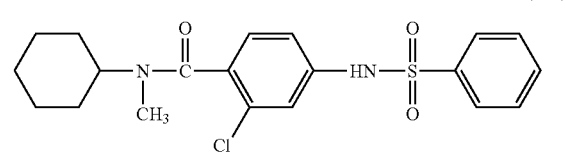

(161)
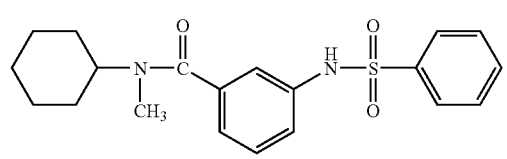

(162)
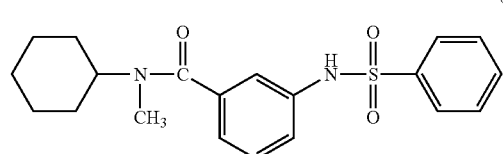

(163)
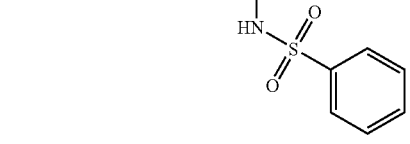

(164)
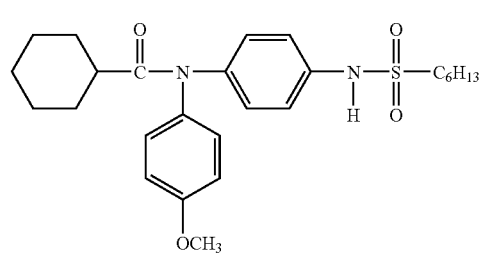

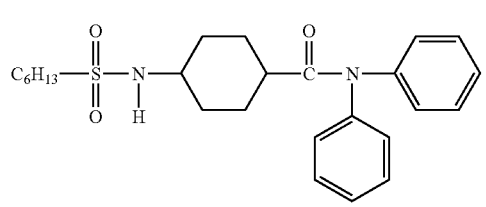

2. Production Method for Optical Film:

The optical film of the invention may be produced according to any of a solvent casting method or a melt casting method. Especially preferred is a solvent casting method. According to a solvent casting method, a cellulose acylate is dissolved in an organic solvent to prepare a dope, and the dope is cast onto the surface of a support formed of a metal or the like, and dried thereon. Next, the formed film is peeled away from the support surface, and stretched. Additives such as a retardation enhancer, a plasticizer and the like may be added to the dope at any timing. Separately from the cellulose acylate solution, an additive solution may be prepared, and these may be mixed to prepare a dope.

Regarding the process for preparing cellulose acylate films, those described in U.S. Pat. Nos. 2,336,310, 2,367,603, 2,492,078, 2,492,977, 2,492,978, 2,607,704, 2,739,069 and 2,739,070; GB Patent Nos. 640731 and 736892; and JP-A Nos. 45-4554, 49-5614, 60-176834, 60-203430 and 62-115035; may be referred.

One example of the production method for the optical film of the invention comprises:

preparing a solution containing at least one cellulose acylate film satisfying the following relations (5) and (6), and at least one retardation enhancer having an absorption maximum wavelength λmax of from 280 nm to 380 nm;

casting the solution onto a support to form a film thereon;

stretching the thus-formed film having a low residual solvent amount in the machine direction;

heating the stretched film at a temperature falling between the glass transition point (Tg) and the melting point (Tm) thereof, thereby producing a cellulose acylate film:

$$2.7 \leq A+B \leq 3.0, \quad (5)$$

$$B \geq 0 \quad (6)$$

wherein A is a degree of substitution with an acetyl group of at least one cellulose acylate; and B is a degree of substitution with an acyl group having at least 3 carbon atoms thereof.

When the cellulose acylate solution containing a retardation enhancer having the above-mentioned absorption maximum is cast and stretched in the machine direction (casting direction), then a cellulose acylate film having regular wavelength dispersion characteristics of Re and Rth can be produced (having a higher retardation level at a shorter wavelength). In this case, the molecules of the retardation enhancer are presumed to be aligned, thereby increasing the degree of polarization of the film in the main chain direction of the cellulose acylate. In order to make the film have reversed wavelength dispersion characteristics of Re (having a higher retardation level at a longer wavelength), the degree of polarization of the film in the direction perpendicular to the main chain direction of the cellulose acylate will have to be higher than the degree of polarization of the film in the main chain direction thereof. According to the above-mentioned method, the acetyl side branches in the cellulose acylate film may be nearly perpendicular to the cellulose main chain, and as a result of heat treatment within a predetermined temperature range, the crystallization of the cellulose acylate may be further promoted whereby the degree of polarization of the film in the direction perpendicular to the cellulose main chain may be increased, and the film may thereby have reversed wavelength dispersion characteristics of Re.

2.-1 Stretching:

The optical film of the invention can be produced through stretching in the machine direction and heat treatment within a predetermined temperature range. The machine direction as referred to herein means, for example, the'direction parallel to the direction in which the dope is cast on the support in film formation in a solvent casting method; and this has the same meaning as that of "casting direction" and "long direction". In the solvent casting method, a dope is cast on a support, and the solvent is evaporated away to give a polymer web; and in this, the web is stretched in the machine direction. The stretching ratio in stretching is preferably less than 45%, more preferably from 7% to 30%, even more preferably from 15% to 25%. The "stretching ratio in pre-stretching (%)" as referred to herein means one obtained according to the following formula:

Stretching Ratio in Pre-stretching(%)=100×{(length after stretching)−(length before stretching)}/ (length before stretching).

The optical film of the invention contains the predetermined cellulose acylate, and so being stretched in the machine direction, the film becomes to have retardation in the negative direction relative to the mechanical direction, that is, the width direction of the film. In the step for bonding the film and a polarizing film together, described later, the film having positive retardation in the width direction may be bonded to a polarizing film, which is for example a stretched PVA film, according to the roll-to-roll method; and therefore, such a film may contribute to improving the productivity of polarizing plates.

It is to be noted that the stretching ratio of the polymer-web in the stretching step may be adjusted by a difference between the speed of the support, which may be made of metal material, and the taken-up speed.

The residual solvent amount in the cellulose acylate web to be stretched is computed according to the following equation, and is from 5 to 1000%. Preferably, the residual solvent amount is from 10 to 200%, more preferably from 30 to 150%, even more preferably from 40 to 100%.

$$\text{Residual Solvent Amount}(\% \text{ by mass}) = \{(M-N)/N\} \times 100$$

[in the formula, M means the mass of the cellulose acylate film just before inserted into the stretching zone; and N means the mass of the cellulose acylate film just before inserted into the stretching zone, dried at 110° C. for 3 hours].

If the polymer-web, having a residual solvent amount equal to or less than 5%, is stretched, the stretched film having high haze may be obtained; and, on the other hand, if the polymer-web, having a residual solvent amount equal to or more than 1000%, is stretched, the effect of developing retardation becomes large by stretching the polymer-web since the external force may easily influence polymer chains. The residual solvent amount in the polymer web may be adjusted to the preferable range by controlling one or more factors such as the concentration of the cellulose acylate, the temperature or speed of metal support, the temperature or amount of the drying air, and the concentration of the solvent gas in the dried atmosphere.

In the step of stretching the polymer-web in the machine direction, the web surface temperature is preferably lower from the viewpoint of transmitting the external force to the polymer. The web temperature is preferably from (Ts−100) to (Ts−0.1)° C., more preferably from (Ts−50) to (Ts−1)° C., even more preferably from (Ts−20) to (Ts−3)° C. In this, Ts means the surface temperature of the casting support. In case where the temperature of the casting support is so set that it varies in different sites, then Ts indicates the surface temperature of the support center.

The residual solvent amount in the thus-dried film is preferably from 0 to 2% by mass, and more preferably from 0 to 1% by mass. The film may be treated by further heat treatment, described later, or after the film is once wound up, it may be subjected to off-line such heat treatment. Preferably, the cellulose acylate film before heat treatment has a width of from 0.5 to 5 m, more preferably from 0.7 to 3 m. In case where the film is once wound up, then the preferred length of the wound film is from 300 to 30000 m, more preferably from 500 to 10000 m, even more preferably from 1000 to 7000 m.

According to the invention, the dried film, having a low residual solvent amount, is subjected to stretching in the machine direction, and also subjected to a heat treatment during or after the stretching treatment. The stretching treatment is referred to as "stretching the film, having a low residual solvent amount, in the machine direction" hereinunder. The term "film, having a low residual solvent amount" means a film whose residual-solvent amount, calculated according to the above mentioned formula, is less than 5%. By stretching the film, having a low residual solvent amount, in the machine direction, the ability of developing Re or Rth may be more easily controlled in the heat treatment. More specifically, by increasing or decreasing the stretching temperature within the range, which is described below, the temperature in the heat treatment can be decreased or the reachable range of Re or Rth can be expanded. As far as not overstepping the spirit and the scope of the invention, other step(s) may be carried out between the step of stretching the film, having a low residual solvent amount, in the machine direction and the step of heat treatment.

The step for stretching the cellulose acylate film, having a low residual solvent amount, in the machine direction may be preferably carried out at a temperature of from (Tg−20)° C. to (Tg+50)° C., where Tg is the glass transition temperature of the cellulose acylate film. The stretching in the machine direction is more preferably carried out at a temperature of from (Tg−10)° C. to (Tg+45)° C., much more preferably at a temperature of from Tg° C. to (Tg+40)° C., and even much more preferably at a temperature of from (Tg+5)° C. to (Tg+35)° C. However, the stretching temperature is not greater than the crystallization temperature (Tc) thereof, described later. The stretching temperature is preferably less than Tc by 5° C. or more, more preferably less than Tc by 10° C. or more, much more preferably less than Tc by 15° C. or more, even much more preferably less than Tc by 20° C. or more, and further even much more than less than Tc by 35° C. or more.

By applying the heat-treatment to the film, the cellulose acylate film is heated up to a temperature of from Tg to Tm, whereby it may be presumed that the structure confirmed in X-ray diffractiometry may be grown and retardation of the film may be thereby adjusted to the preferable range. By stretching the film, having a low residual solvent amount, in the machine direction, the constitutive polymer may be oriented in some degree in the direction, and therefore, the structure confirmed in X-ray diffractiometry of the film can be efficiently and anisotropically grown in the heat treatment described later. The stretching temperature is lower than the heat-treatment temperature, and therefore, the polymer may be oriented even though the structure confirmed in X-ray diffractiometry is not grown further, and its advantage is that the structure confirmed in X-ray diffractiometry can be efficiently grown in the subsequent heat-treatment step. Accordingly, in terms of reducing the temperature in the heat treatment, the stretching direction in the step of stretching the film, having a low residual solvent amount, is preferably same as the direction along which stretching or feeding is carried out in the heat treatment. On the other hand, if they are not same, the reachable range of Re or Rth may be contracted.

For the method of machine-direction stretching or cross-direction stretching and for its preferred embodiments, referred to is the section of heat treatment to be given hereinunder. This is because it is possible to bonding the film and a polarizing film together in the roll-to-roll manner. Preferably, the stretching ratio in the step of stretching the film, having a low residual solvent amount, in the machine direction is from 1 to 500%, more preferably from 3 to 400%, even more preferably from 5 to 300%, still more preferably from 10 to 100%. The stretching may be'effected in one stage or in plural stages. The "stretching ratio in pre-stretching (%)" as referred to herein means one obtained according to the following formula:

Stretching Ratio(%)=100×{(length after stretching)−(length before stretching)}/(length before stretching).

The stretching speed in the step of stretching the film, having a low residual solvent amount, in the machine direction is preferably from 10 to 10000%/min, more preferably from 20 to 1000%/min, even more preferably from 30 to 800%/min.

2.-2 Heat Treatment

After the step of stretching the film, having a low residual solvent amount, in the machine direction, the stretched film is subjected a heat treatment. One concrete embodiment of the heat treatment comprises leading the stretched film to pass through a drying zone by rolls while held by tenter clips, thereby carrying out the heat treatment. The heat treatment is preferably carried out at a temperature, T, which is equal to or higher than the glass transition point, Tg, and is equal to or lower than the melting point, Tm. The term "the glass transition point, Tg" means a boundary temperature at which polymer molecules in the cellulose acylate film are drastically changed. According to the invention, the glass transition temperature is determined as follows: 10 mg of the cellulose acylate film is put into the sample pan of a differential scanning calorimeter (DSC), this is heated from 30° C. up to 120° C. at a rate of 10° C./min in a nitrogen atmosphere, then kept as such for 15 minutes, then cooled to 30° C. at a rate of −20° C./min, and thereafter again heated from 30° C. up to 250° C., whereupon the temperature at which the base line begins to shift from the low-temperature side is read. This is the glass transition temperature of the film.

"Tm" means the melting point of the cellulose acylate film before the heat treatment. The melting point in the invention is determined as follows: 20 mg of the starting cellulose acylate film before heat treatment is put into the sample pan of DSC, this is heated from 30° C. up to 120° C. at a rate of 10° C./min in a nitrogen atmosphere, then kept as such for 15 minutes, then cooled to 30° C. at a rate of −20° C./min, and thereafter again heated from 30° C. up to 300° C., and the endothermic peak starting temperature detected in the cycle is the melting point of the film. Tm generally appears on the higher temperature side than the above-mentioned crystallization temperature (Tc). For example, the melting point of a cellulose triacetate film having a total degree of substitution of 2.85 is about 285° C., though varying depending on the additive, the film-forming condition, etc. The melting point of a cellulose triacetate film having a total degree of substitution of 2.92 is about 290° C.

According to the invention, the heat treatment is preferably carried out at a temperature T (unit: ° C.) meeting the following relation, (7).

$$Tc \leq T < Tm \tag{7}$$

In the relation, "Tc" means the crystallization temperature of the cellulose acylate film before the heat treatment, and its unit is ° C.; and "Tm" means the melting point of the cellulose acylate film before the heat treatment, and its unit is ° C.

In the description, the crystallization temperature, Tc, means a temperature at which polymer molecules in the cellulose acylate film form a periodic structure; and when the temperature of the film is increased higher than Tc, the structure in the film observed by X-ray diffraction may grow. The crystallization temperature in the invention is determined as follows: 10 mg of an un-heat-treated cellulose acylate film is put into a sample pan for DSC, heated in a nitrogen atmosphere at a rate of 10° C./min from 30° C. up to 120° C., kept as such for 15 minutes, and then cooled to 30° C. at a rate of −20° C./min. Then, this is again heated from 30° C. up to 300° C., and the exothermic peak starting temperature detected in the test is crystallization temperature of the film. Tc generally appears on the higher temperature side than the above-mentioned glass transition point (Tc). For example, the crystallization temperature of a cellulose triacetate film having a total degree of substitution of 2.85 is about 190° C., though varying depending on the additive, the film-forming condition, etc. The melting point of a cellulose triacetate film having a total degree of substitution of 2.92 is about 170° C.

By applying the heat treatment at a temperature T, satisfying the condition, to the cellulose acylate film, the development of retardation may be adjusted. The heat treatment temperature preferably satisfies the following relation (7a), more preferably the following relation (7b), and even more preferably the following relation (7c). By selecting the temperature from the range satisfying these relations, it is possible to obtain the enhancement in the development of Re, and sometimes obtain the advantage(s) such as the slow axis which is orthogonal to the stretching direction.

$$Tc \leq T < Tm-5°\ C. \tag{7a}$$

$$Tc \leq T < Tm-10°\ C. \tag{7b}$$

$$Tc+5 \leq T < Tm-15°\ C. \tag{7c}$$

Preferably, the heat treatment in the production method of the invention is attained while the cellulose acylate film is conveyed. The method of conveying the cellulose acylate film is not specifically defined. Typical embodiments include a method of conveying the film by nip rolls or suction drums; a method of conveying the film while held by tenter clips, and a method of flowing and conveying the film by pneumatic pressure. Preferred is the method of conveying the film by nip rolls. More specifically, the nip rolls may be placed ahead and behind the heat-treatment zone; and the film passes thought between the nip rolls, thereby being conveyed.

The film-traveling speed is generally from 1 to 500 m/min, preferably from 5 to 300 m/min, more preferably from 10 to 200 m/min, even more preferably from 20 to 100 m/min. When the film-traveling speed is at least the above-mentioned lowermost limit, 1 m/min, then the method is favorable as capable of securing a sufficient industrial producibility; and when it is at most the above-mentioned highest limit of 500 m/min, then the method is also favorable for the capability of good crystal growth promotion within a practical heat treatment zone length. When the film-traveling speed is higher, then the film coloration may be prevented more; and when it is lower, the heat treatment zone length may be shorter. Preferably, the film-traveling speed during heat treatment (the device speed of the nip rolls and the suction drum that determines the film-traveling speed) is kept constant.

The heat treatment in the production method of the invention includes, for example, a method of leading a cellulose acylate film to run in a zone having a temperature T while transported through it; a method of applying hot air to a cellulose acylate film being transported; a method of irradiating a cellulose acylate film being transported with heat rays; and a method of contacting a cellulose acylate film with a heated roll.

Preferred is the method of leading a cellulose acylate film to run in a zone having a temperature T, to which a hot air is sent, while transported through it. According to the method, a cellulose acylate film may be heated uniformly, which is an advantage. The temperature inside the zone may be controlled and kept constant at T by a heater while monitoring with, for example, a temperature sensor. The traveling length of the cellulose acylate film running in the zone at a temperature T may vary depending on the property of the cellulose acylate film to be produced and on the film-traveling speed; but in general, it is preferably so set that the ratio of (traveling length)/(width of the traveling cellulose acylate film) could be from 0.1 to 100, more preferably from 0.5 to 50, even more preferably from 1 to 20. In this description, the ratio may be referred to as an aspect ratio. The film-running time in the zone at a temperature T (heat treatment time) may be generally from 0.01 to 60 minutes, preferably from 0.03 to 10 minutes, more preferably from 0.05 to 5 minutes. Within the range, the retardation expressibility may be excellent and the processed film may be prevented from being colored.

The film may be stretched at the same time of heat treatment thereof. The stretching direction in the heat treatment is not specifically defined. In case where the cellulose acylate film before heat treatment has anisotropy, preferably, the stretching is in the polymer orientation direction in the cellulose acylate film before heat treatment. The film having anisotropy as referred to herein means that the ratio of the sound wave velocity through the film in the direction in which the sound wave velocity is the maximum to the sound wave velocity in the direction perpendicular to that direction is preferably from 1.01 to 10.0, more preferably from 1.1 to 5.0, even more preferably from 1.2 to 2.5. The sound wave velocity in the direction in which the sound wave velocity is the maximum and in other various directions may be determined as follows: The film to be analyzed is conditioned at 25° C. and at a relative humidity of 60% for 24 hours, then using an orientation analyzer (SST-2500, by Nomura Shoji), this is analyzed to determine the ultrasonic pulse longitudinal wave velocity through the film in the direction in which the ultrasonic pulse longitudinal wave velocity is the maximum, and in other directions.

The stretching method is not specifically defined. According to the embodiments, employing the apparatus having a heat zone between, nip-rolls and carrying out the heat treatment while the film is fed, it is possible to stretch the cellulose acylate film in the machine direction (lateral direction) by adjusting the rotating speed of the nip roll(s) placed at the exit side of the heat zone within the range higher than that of the nip roll(s) placed at the entrance side of the heat zone. According another embodiment, both sides of the cellulose acylate film to be processed are held by tenter clips, and while expanded in the direction perpendicular to the machine direction (cross direction), the film is led to pass through a heating zone and is thereby stretched. When the cellulose acylate film is stretched in the machine direction during the heat treatment, then the development of retardation may be further adjusted. The stretching ratio in the machine direction is generally from 0.8 to 100 times, preferably from 1.0 to 10 times, and more preferably from 1.2 to 5 times. And when the cellulose acylate film is stretched in the direction perpendicular to the machine direction during the heat treatment, then the surface condition of the cellulose acylate film after heat treatment may be bettered. The stretching ratio in the direction perpendicular to the machine direction is generally from 0.8 to 10 times, preferably from 1.0 to 5 times, and more preferably from 1.1 to 3 times. And the stretching speed is preferably from 10 to 10000%/min, more preferably from 20 to 1000%/min, even more preferably from 30 to 800%/min.

During the heat treatment, the cellulose acylate film may be shrunk. Preferably, the shrinking is effected during the heat treatment. When the cellulose acylate film is shrunk during heat treatment, then its optical properties and/or mechanical properties may be controlled. Shrinking the film in the width direction may be carried out not only during heat treatment but also before and after heat treatment. The shrinkage may be attained in one stage or the shrinking step and the stretching step may be effected repeatedly.

The shrinking ratio is preferably from 5 to 80%, more preferably from 10 to 70%, even more preferably from 20 to 60%, and further even more preferably from 25 to 50%. The direction of the shrinkage is not limited. In the embodiments where the heat treatment of the film is carried out while the film is fed, the shrinkage in the direction perpendicular to the machine direction is preferable. In the embodiments where the step of stretching the film is carried out prior to the step of shrinking the film, the shrinkage in the direction perpendicular to the stretching direction is preferable. The shrinking ratio may be adjusted by controlling the temperature in the heat treatment or controlling the external force to be applied to the film. More specifically, the shrinking ratio may be adjusted by controlling the broadening ratio of the distance between the rails when the edges of the film are held by clips. Or, the shrinking ratio may be adjusted by controlling the distance between the means for fixing the film, controlling the tension to be applied to the film or controlling the heat amount to be applied to the film when the edges of the film are not fixed, and the film is supported only by the means such as nip-roll(s) for feeding the film in the machine direction. The shrinking ratio in the width direction can be obtained as follows: The full widths of the film just before and just after being shrunk, respectively; and then the values are substituted into the equation shown below.

$$\text{Shrinking ratio in width direction}(\%) = 100 \times (\text{full width just before shrunk} - \text{full width just after shrunk})/\text{full width just before shrunk}$$

The step of heat treatment at a temperature T of the cellulose acylate film may be once or plural times. The process of "plural times" means that after the previous heat treatment is finished, the film is once cooled to a temperature lower than Tg, then again heated up to a temperature of from a temperature equal to or higher than Tg to a temperature equal to or lower than Tm, and again heat-treated while conveyed under the condition. In the process of heat treatment of plural times, it is desirable that the film after all the heat treatment steps satisfies the above-mentioned range of the stretching ratio in stretching. According to the invention, preferably the heat treatment is effected at most three times, more preferably at most two times, and even more preferably once.

The time of the heat treatment is preferably from about one to about twenty minutes, and more preferably from about five to about fifteen minutes.

The thickness of the film prepared according to the above mentioned method is not limited. In the embodiments wherein the optical film of the invention is used as a member of liquid crystal display devices, which are required to reduce the thickness, the thinner thickness is preferable. However, when the thickness is too thin, the film may not achieve the optical properties required for the application. In the embodiments wherein the optical film of the invention is used as an optical compensation film or a protective film of a polarizer in liquid crystal display devices, the thickness of the film is preferably from about 20 to about 130 µm, more preferably from 30 to 120 µm, and even more preferably from 35 to 115 µm.

2.-3 Surface Treatment

The optical film of the invention may be suitably surface-treated so as to improve its adhesion to various functional layers (e.g., undercoat layer, back layer, optically-anisotropic layer). The surface treatment includes glow discharge treatment, UV irradiation treatment, corona treatment, flame treatment, and acid or alkali saponification treatment; and glow discharge treatment and alkali saponification treatment are preferred. The term of "glow discharge treatment" in the description is used for any treatments with low-temperature plasma generated in the place of low-pressure, $10^{-3}$-20 Torr, gas, or for any plasma treatments under atmospheric pressure. Examples of the plasma-exciting vapor, which is capable of exciting plasma under the above mentioned condition, include argon, helium, neon, krypton, xenon, nitrogen, carbon dioxide, Freon such as tetrafluoromethane and any mixtures thereof. The details of the surface treatment are described in Hatsumei Kyokai Disclosure Bulletin (No. 2001-1745, published by the Hatsumei Kyokai on Mar. 15, 2001), and may be suitably applied to the invention. According to the plasma treatment under atmospheric pressure, which may attract attention recently, the irradiation energy of from 20 to 500 Kgy may be used under a condition of from 10 to 1000 Key; and preferably, the irradiation energy of from 20 to 300 Kgy may be used under a condition of from 30 to 500 Key. Among the above mentioned treatments, any alkali saponification treatment is preferable.

The alkali saponification treatment may be carried out according to the method wherein the cellulose acylate film is dipped directly in the tank filled with saponification liquid or saponification liquid is coated to the cellulose acylate film. Examples of the coating method include dip-coating method, curtain-coating method, extrusion-coating method, bar-coating method and E-type coating method. The solvent for preparing the saponification liquid may be selected from any solvents having good wettability sufficient for coating the saponification to the film and keeping the good condition of the surface without occurring irregularities in the surface of the film. Examples of the solvent include alcohol-type solvents; and isopropyl alcohol is especially preferable. Or the aqueous solution of surfactant may be used as the solvent. The alkali contained in the saponification-coating liquid is preferably dissolved in the solvent; and KOH and NaOH are more preferable. The pH value of the saponification coating liquid is preferably equal to or more than 10, and more preferably equal to or more than 12. The alkali saponification treatment is preferably carried out at a room temperature for a time from one second to five minute, more preferably from 5 seconds to five minutes, and especially preferably from 20 seconds to three minutes. After the alkali saponification treatment, the surface subjected to the saponification liquid is preferably washed with water or acid.

3. Use of Optical Film:

The optical film of the invention has many applications. For example, it may be used as an optical compensation film in liquid-crystal display devices, as a protective film of polarizing plates, etc.

(Optical Compensation Film)

The optical film of the invention may be used as an optical compensation film. "Optical compensation film" means an optical material having optical anisotropy generally for use in display devices such as liquid-crystal display devices, etc., and this has the same meaning as that of an optical compensation sheet or the like. In a liquid-crystal display device, such an optical compensation film is used for the purpose of enhancing the contrast of the display panel, for enlarging the viewing angle and for reducing undesirable color shift.

Plural optical films of the invention may be laminated, or the optical film of the invention may be laminated with any other retardation film, thereby suitably controlling Re and Rth of the resulting laminate to be an optical compensation film. The film lamination may be attained with a sticking paste or an adhesive.

3.-1 Polarizing Plate:

The optical film of the invention may be used as a protective film for polarizing plates, and the invention provides a polarizing plate comprising the film. One example of the polarizing plate of the invention comprises a polarizing film and two protective films (transparent films) for protecting both surfaces of the polarizing film, in which the optical film of the invention is used as at least one of the polarizing plate-protective films. In an embodiment where the optical film of the invention is used as a support and an optically-anisotropic layer of a liquid-crystal composition is formed on the surface of the support, and where the optical film is used as a protective film for a polarizing plate, it is desirable that the back side (on which the optically-anisotropic layer is not formed) of the optical film of the invention serving as a support is stuck to the surface of the polarizing film. The other protective film is not specifically defined. For the other protective film, usable are various films generally used for protective films for polarizing plates, such as ordinary cellulose acylate films and the like; and needless-to-say, the optical film of the invention may be used as the other protective film.

As the polarizing element of the polarizing plate, usable are an iodine-containing polarizing element, a dichroic dye-containing polarizing element, or a polyene-containing polarizing element. The iodine-containing polarizing element and the dichroic dye-containing polarizing element may be produced, generally using a polyvinyl alcohol film. In case where the cellulose acylate film of the invention is used as a protective film for a polarizing plate, the production method for the polarizing plate is not specifically defined. The polarizing plate may be produced in any ordinary method. For example, the obtained cellulose acylate film is processed with an alkali, and then stuck to both surfaces of a polarizing element produced by dipping a polyvinyl alcohol film in an iodine solution and stretching it, using an aqueous solution of a completely-saponified polyvinyl alcohol. Not processed with an alkali, the optical film of the invention may be processed in a different manner for enhancing the adhesiveness of the surface thereof as disclosed in JP-A-6-94915 or JP-A-6-118232. The adhesive agent to be used in sticking the a polarizing element to the processed surface of the protective film may be, for example, a polyvinyl alcohol-type adhesive such as polyvinyl alcohol, polyvinyl butyral or the like, or a latex of a vinylic polymer such as butyl acrylate polymer, etc. As so mentioned in the above, the polarizing plate generally has a protective film for protecting both surfaces of the polarizing element therein. In addition, to one surface of the polarizing plate, a protective film may be stuck; and to the other surface thereof, a separate film may be stuck. The protective film and the separate film are given thereto for the purpose of protecting the polarizing plate during shipping or product inspection. In this case, the protective film is stuck for the purpose of protecting the surface of the polarizing plate, and it is stuck to the surface thereof opposite to the surface to which a liquid-crystal cell is to be stuck. The separate film is for the purpose of covering the adhesive layer of the polarizing plate via which the polarizing plate is to be stuck to a liquid-crystal cell, and therefore, the separate film is stuck to the surface of the polarizing plate to which a liquid-crystal cell is to be stuck.

Preferably, the optical film of the invention is stuck to a polarizing element in such a manner that its in-plane slow axis could be parallel to the transmission axis of the polarizing element.

When the perpendicular crossing accuracy between the in-plane slow axis of the optical film of the invention and the absorption axis of the polarizing element (that is perpendicular to the transmission axis thereof) is larger than 1°, then the polarization performance of the polarizing plate in cross-Nicol configuration may worsen, therefore causing light leakage; and when the polarizing plate in that condition is combined with a liquid-crystal cell, the device could not have a sufficient black level and a sufficient contrast. For these reasons, therefore, the deviation of the in-plane slow axis direction of the optical film of the invention from the transmission axis direction of the polarizing element to be combined with the film is preferably at most 1°, more preferably at most 0.5°.

The hue a* and b* in cross-Nicol configuration of the polarizing plate of the invention is preferably $-1.0 \leq a^* \leq 2.0$ and $-1.0 \leq b^* \leq 2.0$ for reducing the color shift at the time of black level of display of liquid-crystal display devices, more preferably $-0.5 \leq a^* \leq 1.5$ and $-0.5 \leq b^* \leq 1.5$.

The hue a* and b* of the polarizing plate may be determined as follows: The spectral transmittance of the polarizing plate in a visible light region is measured with a spectrophotometer, then the spectral transmittance thus measured is multiplied by a color-matching function and integrated to give tristimulus value X, Y and Z, and a* and b* is derived from the definition of the CIE1976L*a*b* color space. The details are described in "Basis of Color Reproduction Optics" (Corona).

Concretely, using a spectrophotometer UV-3100 (by Shimadzu) in a color measurement mode, the transmittance is measured under the test condition mentioned below and the hue of the polarizing plate is computed. The test wavelength range is from 780 to 380 nm; the scanning speed is middle; the slit width is 2.0 nm; the sampling pitch is 1.0 nm; the light source is C light source; the viewing field is 2°. Two polarizing plates are so set that the protective films thereof on the cell side could face each other with the transmission axes thereof kept perpendicular to each other, and that the transmission axes of the polarizing plates could be at 45° relative to the normal direction (the direction of the grating groove) of the sample room of the spectrophotometer.

The polarizing plate of the invention may comprise at least one layer of a hard coat layer, an antiglare layer and an antireflection layer. In use of the polarizing plate in a liquid-crystal display device, a functional film such as an antireflection layer or the like is preferably provided on the panel side of the polarizing plate that is positioned on the panel side of the device. The functional film is preferably at least one layer of a hard coat layer, an antiglare layer and an antireflection layer. The functional layers may not be separate layers, but for example, an antireflection layer or a hard coat layer may have an additional function as an antiglare layer so that the antireflection layer or the hard coat layer may serve additionally as an antiglare layer.

For the functional layers that may be in the polarizing plate of the invention, employable are the technique of an antireflection layer described in JP-A 2007-140497, [0158]-[0159]; the technique of a light-scattering layer described in JP-A 2007-140497, [0160]-[0161]; the technique of an antireflection layer (AR film) comprising a middle-refractivity layer, a high-refractivity layer and a low-refractivity layer laminated in that order, described in JP-A 2007-140497,

[0162]-[0163]; and the technique of a hard coat layer and an antistatic layer described in JP-A 2007-140497, [0164]-[0165].

3.-2 Liquid-Crystal Display Device:

The liquid-crystal display device of the invention comprises a liquid-crystal cell and two polarizing plates disposed on both sides of the cell, in which at least one polarizing plate is the polarizing plate of the invention.

The optical film and the polarizing plate comprising the film of the invention are usable in liquid-crystal cells of various display modes such as TN (Twisted Nematic), IPS (In-Plane Switching), FLC (Ferroelectric Liquid Crystal), AFLC (Anti-ferroelectric Liquid Crystal), OCB (Optically Compensatory Bend), STN (Supper Twisted Nematic), VA (Vertically Aligned) and HAN (Hybrid Aligned Nematic) modes. They are favorable for VA modes and OCB modes, more favorable for VA modes.

In the VA-mode liquid-crystal cell, rod-shaped liquid-crystal molecules are aligned substantially vertically under no voltage application. The VA-mode liquid-crystal cell includes, in addition to (1) the VA-mode liquid crystal cell of a narrow sense, where rod-shaped liquid-crystal molecules are aligned substantially vertically under no voltage application and are aligned horizontally under voltage application (described in JP-A 2-176625), (2) a multidomained VA-mode (MVA-mode) liquid-crystal cell with enlarged viewing angles (described in SID 97, Digest of Tech. Papers (preprints) 28 (1997), 845), (3) a liquid crystal cell of an n-ASM mode or a CPA mode in which the rod-shaped liquid crystal molecules are aligned substantially vertically under no voltage application and are aligned in twisted multi-domains under voltage application (described in preprints in the Japan Liquid Crystal Discussion, 58-59 (1998), and (4) a liquid crystal cell of a SURVIVAL mode (announced in LCD International 98).

FIG. 1 shows one example of a VA-mode liquid-crystal display device of the invention. The VA-mode liquid-crystal display device of in FIG. 1 comprises a liquid-crystal cell LC (comprising an upper substrate 1, a lower substrate 3 and a liquid-crystal layer 5), and a pair of an upper polarizing plate P1 and a lower polarizing plate P2 disposed to sandwich the liquid-crystal cell LC therebetween. In general, polarizing films are incorporated into the liquid-crystal display device as polarizing plates having a protective film on both surfaces thereof; however, in FIG. 1, the outer protective film of the polarizing film is omitted. The polarizing plates P1 and P2 each have a polarizing film 8a and 8b, respectively; and they are so disposed that the absorption axes 9a and 9b thereof are perpendicular to each other. The liquid-crystal cell LC is a VA-mode liquid-crystal cell, and at the time of black level of display, the liquid-crystal layer 5 is in homeotropic alignment as in FIG. 1. The upper substrate 1 and the lower substrate 3 each have an alignment film (not shown) and an electrode layer (not shown) on the inner surface thereof; and the substrate 1 has a color filter layer (not shown) on the viewers' side inner surface thereof.

Between the upper substrate 1 and the upper polarizing film 8a, and between the lower substrate 3 and the lower polarizing film 8b, disposed are protective films 10a and 10b, respectively. The protective films 10a and 10b are optical films of the invention. The protective films 10a and 10b are so disposed that the in-plane slow axes 11a and 1b thereof could be perpendicular to the absorption axes 9a and 9b of the upper polarizing film 8a and the lower polarizing film 8b, respectively. Specifically, the protective films 10a and 10b are so disposed that their slow axes are perpendicular to each other. The protective films 10a and 10b each comprising the optical film of the invention contribute toward reducing the light leakage and the color shift that may occur in oblique directions at the time of black level of display.

(Principle of Optical Compensation)

Figure 2:
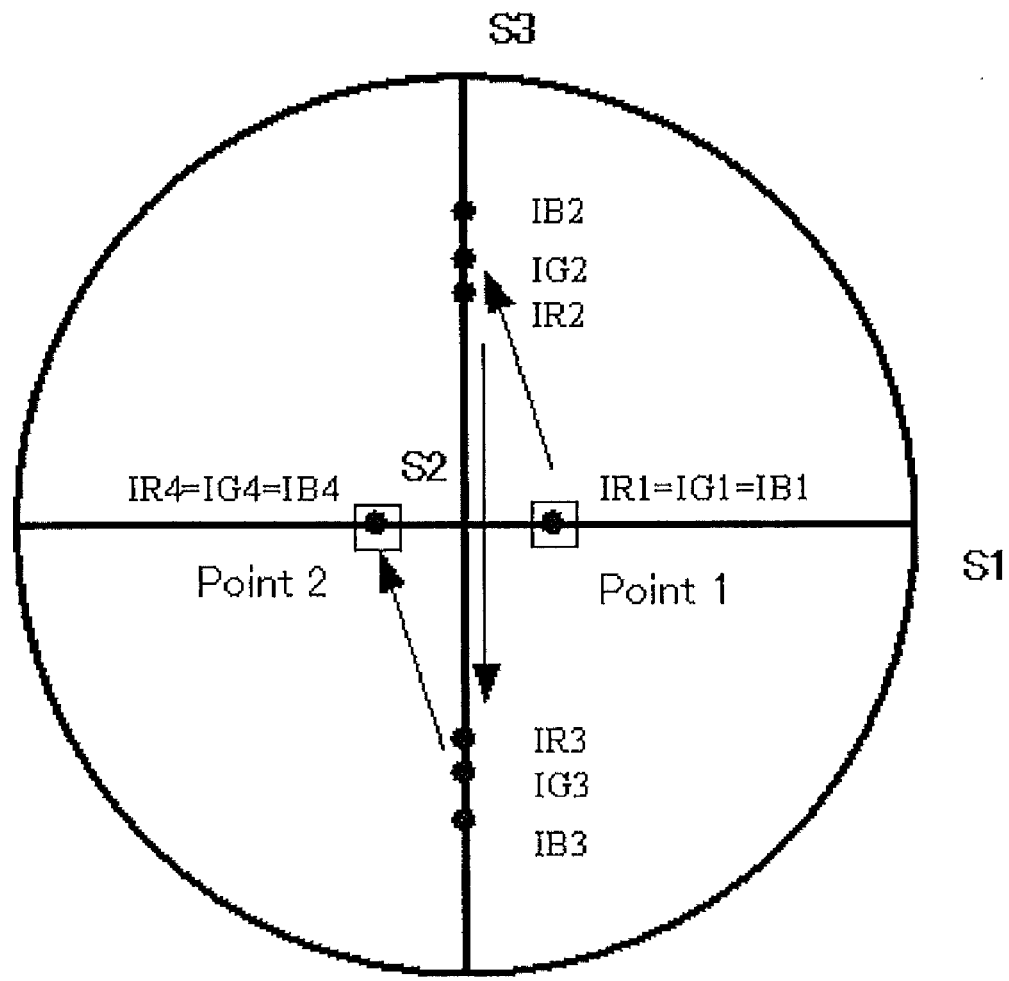
FIG. 2 is a view for explaining the optical compensation in a VA-mode liquid-crystal display device of the invention.
Figure 3:
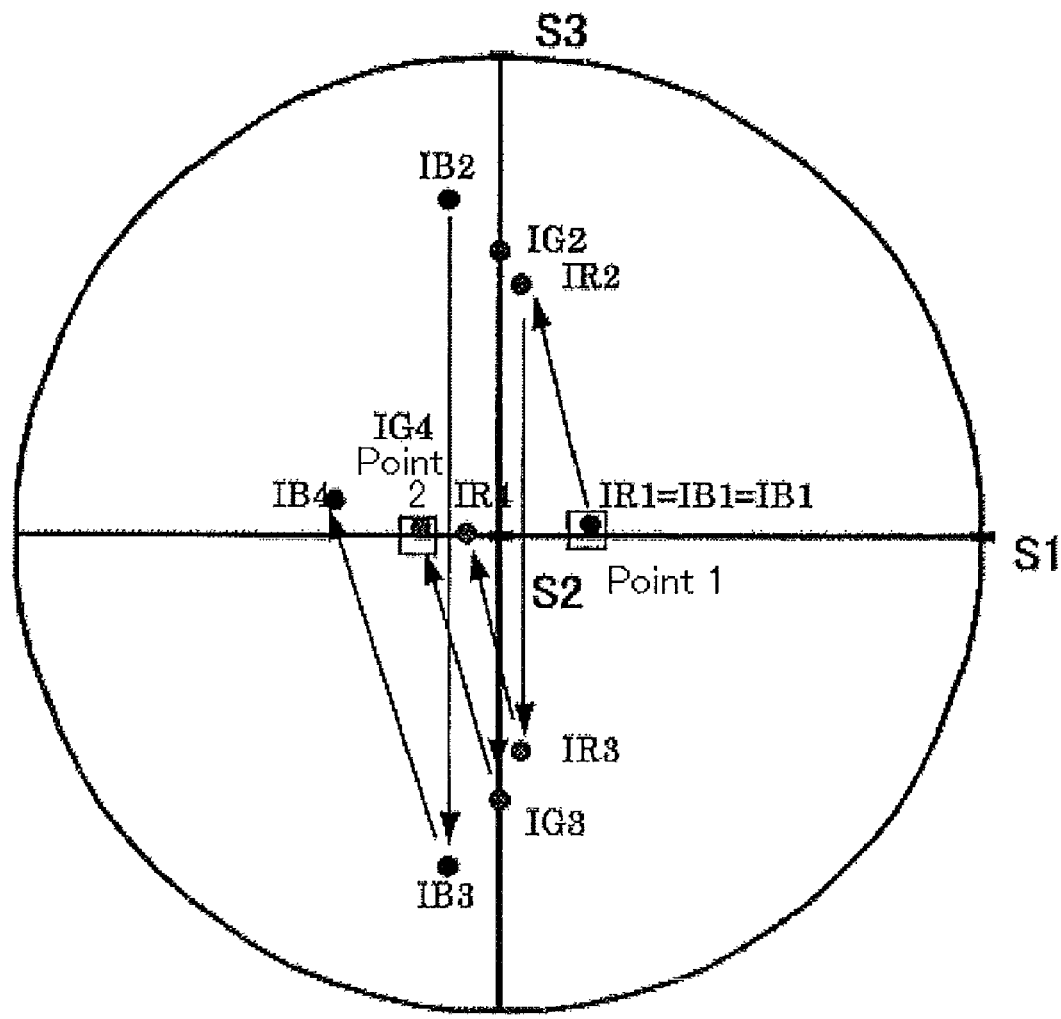
FIG. 3 is a view for explaining the optical compensation in a conventional VA-mode liquid-crystal display device.

With reference to FIG. 3, optical compensation in a conventional VA-mode liquid-crystal display device is described using a Poincare sphere. The prior art technique disclosed is an example of optical compensation in a constitution where two biaxial films are positioned between a polarizing plate and a liquid-crystal layer separately one by one. Concretely, in this example, retardation films not having wavelength dispersion characteristics of Re and Rth are used as the protective films 10a and 10b in FIG. 1. In this, the light diffusion direction is at the azimuth angle of 45 degrees and a polar angle of 34 degrees. In FIG. 3, the S2 axis is an axis that runs perpendicularly through the paper from the top to the bottom thereof. FIG. 3 is a view in which the Poincare sphere is seen from the positive direction of the S2 axis. FIG. 3 is shown as a planar configuration, in which, therefore, the displacement of the point before and after polarization change is shown by the linear arrow in the drawing. In fact, however, on a Poincare sphere, the polarization change of light passing through a liquid-crystal layer and an optical compensation film shall be expressed by rotation at a specific angle around a specific axis to be determined by the optical properties of the layer or the film. The same shall apply to FIG. 2.

In FIG. 3, the polarization state of the incident light having passed through the polarizing film on the backlight side corresponds to the point 1 (shown by a square in the drawing) in FIG. 3; and the polarization state shielded by the absorption axis of the polarizing film on the panel side corresponds to the point 2 (shown by a square in the drawing) in FIG. 3. Heretofore, in a VA-mode liquid-crystal display device, the off-axis light penetration in oblique directions is caused by the deviation of the axis of the polarizing film from the perpendicular configuration when watched in oblique directions, and this brings about the deviation at the point 1 and the point 2. In a VA-mode liquid-crystal display device, the optical compensation film generally acts for changing the incident light polarization state from the point 1 to the point 2 including the polarization state change in the liquid-crystal layer. In the drawing, the incident light is expressed for the transition of three, R (red), G (green) and B (blue) thereof. The incident light just after having passed through the polarizing film on the backlight side is on the same state for R, G and B (IR1=IG1=IB1); but after having passed through the retardation film, the state changes to IR2, IG2 and IB2, respectively. Afterwards, the light comes in the liquid-crystal cell. At the time of black level of display, the liquid-crystal layer exhibits a positive refractivity anisotropy and is in vertical alignment. Accordingly, the polarization state change of the incident light having passed through the liquid-crystal layer rotates at an angle proportional to a value $\Delta n'd'/\lambda$ to be computed by dividing the effective retardation $\Delta n'd'$ in an oblique direction of the liquid-crystal layer at a wavelength $\lambda$, by the wavelength, thereby reaching IR3, IG3 and IB3, respectively, as shown by the arrow from the top to the bottom in FIG. 3. Afterwards, the light changes to IR4, IG4 and IB4 in the retardation film. Further afterwards, the light comes in the polarizing film on the panel side, and is absorbed at the absorption axis (point 2). In general, however, the optical properties of retardation film are optimized mainly for light G, and therefore, only light G is absorbed at the absorption axis (point 2). In the retardation film of which the wavelength dispersion characteristics of retardation are not optimized, light R and light B could not reach the point 2. This is one cause of lowering the contrast in oblique directions.

In the invention, optical compensation is realized so that light at all wavelengths of R, G and B can reach the point 2, and therefore, the problem is solved by providing a biaxial transparent film controlled in point of the wavelength dispersion characteristics of retardation thereof so as to make the film have reversed wavelength dispersion characteristics of Re and have regular wavelength dispersion characteristics of Rth. The principle is shown in FIG. 2.

In FIG. 2, the incident light, the light R, the light G and the light B just having passed through the polarizing plate 1 are all the same state (IR1=IG1=IB1), but after having passed through the transparent film, they change to IR2, IG2 and IB2, respectively. In this stage, the S1 value of IB2, IG2 and IR2 is preferably near to 0. In that condition, the S1 value of IB3, IG3 and IR3 that the light R, G and B may reach after having passed through the liquid-crystal layer and having changed differently by Δn'd'/λ, all could be near to 0. Further, after having passed through the transparent film disposed on the back side of the device, R, G and B further change, and the polarization state just before the polarizing plate 2 may be IR4=IG4=IB4, or that is, complete compensation is thereby realized irrespective of the wavelength of light. The optical film of the invention has optical characteristics satisfying the above-mentioned formulae (1) to (4), and therefore realizes the polarization state transition as illustrated.

EXAMPLES

The invention is described more concretely with reference to the following Examples, in which the material and the reagent used, their amount and their ratio, the details of the treatment and the treatment process may be suitably modified or changed not overstepping the sprit and the scope of the invention. Accordingly, the scope of the invention should not be limited by the following Examples.

1. Example 1

Formation of Film A-1

The constitutive ingredients shown in the following Table were mixed to prepare a cellulose acetate solution A. The cellulose acetate solution was cast onto a metal support, and the resulting web was peeled away from the band support and further dried to give a transparent film having a thickness of 100 μm. The film having a solvent content of at most 1.0% was stretched by 12% in the machine direction in an environment at 125° C. with the side edges thereof kept free, and then both side edges of the film were kept held, this was heated at 200° C. for 10 minutes to give a film A-1. Its optical properties are shown in the following Table. Before heat treatment, the glass transition point Tg of the film was 150° C., the crystal-lization temperature Tc thereof was 175° C., and the melting point Tm thereof was 250° C.

Formulation:

| | |
|---|---|
| Cellulose Acetate having the degree of the substitution with acetyl of 2.92 | 100 parts by mass |
| Compound A shown below | 12 parts by mass |
| Compound B shown below (λmax = 369 nm) | 7.5 parts by mass |
| Mat agent ("AEROSIL R972", produced by AEROSIL JAPANA) | 0.05 parts by mass |
| Methylene chloride | 546 parts by mass |
| Methanol | 82 parts by mass |

Compound A:

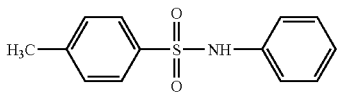

Compound B:

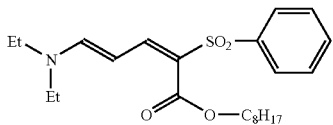

2. Examples 2 to 9

Formation of Films A-2 to A-9

Films A-2 to A-9 were formed in the same manner as above, for which, however, the amount of the compound B to be added, the stretching ratio in stretching before heat treatment and the film thickness were changed. Before heat treatment, the glass transition point Tg, the crystallization temperature Tc and the melting point Tm of these films A-2 to A-9 were the same as those of the film A-1. The residual solvent content of these films in stretching in the machine direction was also the same as that of the film A-1.

The amount of the compound B to be added, the stretching ratio in stretching and the film thickness are shown in the following Table. The optical properties of the films are also shown in the following Table.

| | | | Example No. | | | | | | | | |
|---|---|---|---|---|---|---|---|---|---|---|---|
| | | | 1 | 2 | 3 | 4 | 5 | 6 | 7 | 8 | 9 |
| | | | Film No. | | | | | | | | |
| | | | A-1 | A-2 | A-3 | A-4 | A-5 | A-6 | A-7 | A-8 | A-9 |
| Amount of Compound B | [%]*1 | | 7.5 | 7.5 | 10 | 7.5 | 10 | 10 | 7.5 | 7.5 | 7.5 |
| Stretching | Temperature | [° C.] | 125 | 125 | 125 | 125 | 125 | 125 | 125 | 125 | 125 |
| | Ratio | [%] | 12 | 17 | 40 | 15 | 35 | 30 | 6 | 13 | 20 |

*1 relative to the mass of cellulose acylate

3. Example 10

Formation of Film A-10

A film A-10 was formed in the same manner as that for the film A-9 in Example 2, for which, however, the following compound C (λmax=369 nm) was used in place of the compound B. The optical properties of the film are shown in the following Table. Before heat treatment, the glass transition point Tg of the film A-10, the crystallization temperature Tc thereof and the melting point Tm thereof were the same as those of the film A-1.

Compound C:

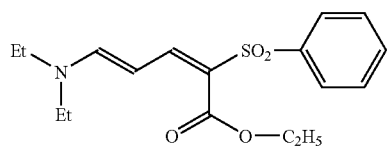

Compound D:

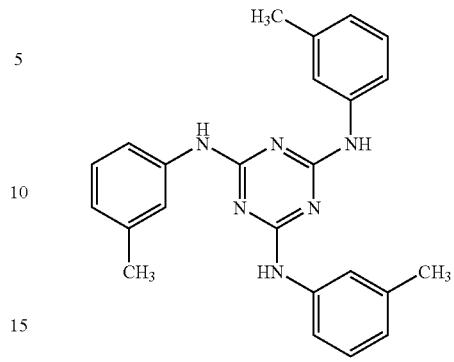

4. Example 11

Formation of Film A-11

The constitutive ingredients shown in the following Table were mixed to prepare a cellulose propionate solution. The cellulose propionate solution was cast onto a metal support, and the resulting web was peeled away from the band support to give a transparent film having a thickness of 70 μm. The film having a solvent content of at most 1.0% was stretched by 20% in the machine direction in an environment at 170° C. with the side edges thereof kept free, and then both side edges of the film were kept held, this was heated at 200° C. for 10 minutes to give a film A-11. Its optical properties are shown in the following Table.

Formulation:

| | |
|---|---|
| Cellulose Acetate propionate having the degree of the substitution with acetyl of 2.45 and the degree of the substitution with acetyl of 0.55 | 100 parts by mass |
| Compound A | 12 parts by mass |
| Compound B shown | 7.5 parts by mass |
| Mat agent ("AEROSIL R972", produced by AEROSIL JAPANA) | 0.05 parts by mass |
| Methylene chloride | 546 parts by mass |
| Methanol | 82 parts by mass |

5. Comparative Example 1

Formation of Comparative Film B-1

A film B-1 was formed in the same manner as that for the film A-9, for which, however, the following compound D (λmax=250 nm) was used in place of the compound B. The optical properties of the film are shown in the following Table.

6. Comparative Example 2

Formation of Film B-2

The constitutive ingredients shown in the following Table were mixed to prepare a cellulose acetate solution. The cellulose acetate solution was cast onto a metal support, and the resulting web was peeled away from the band support to give a transparent film having a thickness of 70 μm. The film having a solvent content of at most 1.0% was stretched by 20% in the machine direction in an environment at 180° C. with the side edges thereof kept free, and then both side edges of the film were kept held, this was heated at 200° C. for 10 minutes to give a film B-2. Its optical properties are shown in the following Table.

Formulation:

| | |
|---|---|
| Cellulose Acetate having the degree of the substitution with acetyl of 2.41 | 100 parts by mass |
| Compound A shown above | 12 parts by mass |
| Compound B shown above | 5 parts by mass |
| Mat agent ("AEROSIL R972", produced by AEROSIL JAPANA) | 0.05 parts by mass |
| Methylene chloride | 535 parts by mass |
| Methanol | 80 parts by mass |

7. Comparative Example 3

Formation of Film B-3

A norbornene film, Zeonoa ZF14 (by Nippon Zeon) having a thickness of 100 μm was stretched by 13 times in the cross direction at 150° C. to give a film B-3. Its optical properties are shown in the following Table.

8. Comparative Example 4

Formation of Film B-4

The same cellulose acylate solution A as that for the film A-1 was cast onto a metal support, and the resulting web was peeled away from the band support to give a transparent film having a thickness of 100 μm. The film having a solvent content of at most 1.0% was stretched by 22% in the cross direction in an environment at 125° C., and with both side edges of the film kept held, this was heated at 200° C. for 10 minutes to give a film B-4. Its optical properties are shown in the following Table.

9. Comparative Example

Formation of Film B-5

The same cellulose acylate solution A as that for the film A-1 was cast onto a metal support, and the resulting web was peeled away from the band support to give a transparent film having a thickness of 100 μm. The film having a solvent content of at most 1.0% was stretched by 10% in the machine direction in an environment at 125° C. to give a film B-5. In this, the film was not subjected to heat treatment. Its optical properties are shown in the following Table.

10. Optical Properties of Formed Films

|  |  | Example 1 | Example 2 | Example 3 | Example 4 | Example 5 | Example 6 |
|---|---|---|---|---|---|---|---|
|  |  | \multicolumn{6}{c}{Optical Film} |
|  |  | A-1 | A-2 | A-3 | A-4 | A-5 | A-6 |
| thickness | [μm] | 111 | 110 | 77 | 80 | 80 | 80 |
| Re 450 nm | [nm] | 28 | 31 | 59 | 43 | 42 | 37 |
| 550 nm | [nm] | 35 | 40 | 70 | 51 | 60 | 52 |
| 630 nm | [nm] | 36 | 41 | 71 | 52 | 62 | 53 |
| Rth 450 nm | [nm] | 177 | 179 | 128 | 115 | 148 | 138 |
| 550 nm | [nm] | 138 | 140 | 100 | 90 | 102 | 95 |
| 630 nm | [nm] | 133 | 135 | 95 | 85 | 97 | 91 |
| ΔRe(630-450) | [nm] | 8 | 9 | 12 | 9 | 19 | 17 |
| ΔRth(630-450) | [nm] | −44 | −45 | −33 | −30 | −50 | −47 |

|  |  | Example 7 | Example 8 | Example 9 | Example 10 | Example 11 |
|---|---|---|---|---|---|---|
|  |  | \multicolumn{5}{c}{Optical Film} |
|  |  | A-7 | A-8 | A-9 | A-10 | A-11 |
| thickness | [μm] | 92 | 92 | 92 | 90 | 58 |
| Re 450 nm | [nm] | 39 | 53 | 55 | 56 | 42 |
| 550 nm | [nm] | 46 | 63 | 66 | 62 | 60 |
| 630 nm | [nm] | 46 | 63 | 67 | 62 | 62 |
| Rth 450 nm | [nm] | 128 | 129 | 135 | 123 | 148 |
| 550 nm | [nm] | 100 | 101 | 106 | 105 | 102 |
| 630 nm | [nm] | 95 | 95 | 100 | 101 | 97 |
| ΔRe(630-450) | [nm] | 6 | 11 | 11 | 12 | 6 |
| ΔRth(630-450) | [nm] | −33 | −33 | −33 | −35 | −22 |

|  |  | Comparative Example 1 | Comparative Example 2 | Comparative Example 3 | Comparative Example 4 | Comparative Example 5 |
|---|---|---|---|---|---|---|
|  |  | \multicolumn{5}{c}{Optical Film} |
|  |  | B-1 | B-2 | B-3 | B-4 | B-5 |
| thickness | [μm] | 82 | 65 | 90 | 92 | 92 |
| Re 450 nm | [nm] | 19 | 71 | 55 | 53 | −21 |
| 550 nm | [nm] | 15 | 60 | 55 | 63 | −25 |
| 630 nm | [nm] | 15 | 59 | 55 | 63 | −25 |
| Rth 450 nm | [nm] | 61 | 90 | 121 | 129 | 74 |
| 550 nm | [nm] | 49 | 105 | 120 | 101 | 58 |
| 630 nm | [nm] | 47 | 113 | 120 | 95 | 55 |
| ΔRe(630-450) | [nm] | −4 | −12 | 0 | 11 | −4 |
| ΔRth(630-450) | [nm] | −14 | 22 | −1 | −33 | −19 |

11. Formation of Polarizing Plate

A polyvinyl alcohol (PVA) film having a thickness of 80 μm was dipped in an aqueous potassium iodide solution having a potassium iodide concentration of 2% by mass, at 30° C. for 60 seconds and dyed therein, and then this was dipped in an aqueous boric acid solution having a boric acid concentration of 4% by mass for 60 seconds during which this was stretched in the machine direction by 5 times the original length, and thereafter this was dried at 50° C. for 4 minutes to give a polarizing element A having a thickness of 20 μm.

The above-mentioned optical films A-1 to A-11, B-1 to B-2, and B-4 to B-5, and a commercial cellulose acylate film (Fujitac TDY80UL, by FUJIFILM) were dipped in an aqueous sodium hydroxide solution (1.5 mol/liter) at 55° C., and then fully washed with water to remove sodium hydroxide. Next, these were dipped in an aqueous diluted sulfuric acid solution (0.005 mol/liter) at 35° C. for 1 minute, then dipped in water and fully washed therein to remove the aqueous diluted sulfuric acid solution. Finally, the samples were fully dried at 120° C.

Thus saponified in the manner as above, the optical films A-1 to A-11, B-1 to B-2, and B-5 each were stuck to the commercial cellulose acylate film, Fujitac TDY80UL (by FUJIFILM) with a polarizing element sandwiched therebetween, using a polyvinyl alcohol adhesive, thereby producing polarizing plates A-1 to A-11, B-1 to B-2, and B-5.

Except the optical film B-4, the optical films were so stuck to the polarizing element that the length direction of the polarizing element could correspond to the length direction (casting direction) of each optical film. The optical film B-4 was cut into a desired shape, and then stuck to the polarizing element so that its stretching direction could correspond to the length direction of the polarizing element, thereby producing a polarizing plate. In this case, the producibility was extremely poor.

A polarizing plate B-3 was produced by sticking the optical film B-3 to a polarizing element previously having a commercial cellulose acylate film (Fujitac TDY80UL, by FUJIFILM) stuck to one surface thereof, using an adhesive. These were so stuck together that the length direction of the polarizing element could correspond to the length direction of the optical film B-3.

12. Production of Liquid-Crystal Display Device

The polarizing plates and the retardation films on the surface and the back of a commercial 40-inch VA-mode liquid-crystal TV (by SHARP) were peeled away, and the resulting liquid-crystal cell was used herein.

A polarizing plate A-1 produced in the above was stuck to the liquid-crystal cell on the backlight side thereof so that its optical film could face the cell and that the length direction of the polarizing element could correspond to the longitudinal direction of the liquid-crystal cell (the vertical direction of the display panel). Similarly, another polarizing plate A-1 to be a pair with the above was stuck to the liquid-crystal cell on the panel side thereof so that its optical film could face the cell and that the length direction of the polarizing element could correspond to the cross direction of the liquid-crystal cell (the horizontal direction of the display panel). In that manner, a liquid-crystal display device 1 was produced.

Quite similarly, liquid-crystal display devices 2 to 15 were produced, for which, however, any of polarizing plates A-2 to A-11, B-1 to B-3 and B-5 was used in place of the polarizing plate A-1.

12. Determination of Optical Properties of Liquid-Crystal Display Device

Using a tester (EZ-Contrast 160D, by ELDIM), the liquid-crystal display devices produced in the above were tested in a dark room conditioned at 25° C. and 60% RH, for the brightness and the chromaticity at the time of black level of display and at the time of white level of display; and the color shift (color change) at the time of black level of display, and the contrast ratio represented by (brightness at the time of white level of display/brightness at the time of black level of display) were determined through computation. The results are shown in the following Table. The color shift at the time of black level of display and the contrast ratio are based on the criteria mentioned below.

[Contrast Ratio]

At an azimuth angle of 45°, 135°, 225° and 315°, and at a polar angle of 60°, the mean value of the contrast value, CR was determined. The tested samples were evaluated on the basis of the criteria mentioned below.
OO: CR is at least 90.
O: CR is from 70 to less than 90.
Δ: CR is from 50 to less than 70.
x: CR is less than 50.

[Color Shift]

The viewing field was rotated at a polar angle of 60° and an azimuth angle of from 0 to 360°. On the u'v' chromaticity diagram, the maximum value and the minimum value of u' are represented by u'(max) and u'(min), respectively; and the maximum value and the minimum value of v' are by v'(max) and v'(min), respectively. Δu'v' is defined by the following formula:

$$\Delta u'v' = \{(u'\max - u'\min)^2 + (v'\max - v'\min)^2\}^{0.5}$$

The tested samples were evaluated on the basis of the criteria mentioned below.
A: Δu'v' is less than 0.02.
B: Δu'v' is from 0.02 to less than 0.04.
C: Δu'v' is from 0.04 to less than 0.06.
D: Δu'v' is 0.06 or more.

| LCD | Polarizing plate | Contrast in oblique direction | Color shift in black state (Δu' v') | Note |
|---|---|---|---|---|
| 1 | A-1 | C | B | Example |
| 2 | A-2 | C | B | Example |
| 3 | A-3 | C | B | Example |
| 4 | A-4 | B | C | Example |
| 5 | A-5 | A | A | Example |
| 6 | A-6 | A | A | Example |
| 7 | A-7 | B | C | Example |
| 8 | A-8 | B | B | Example |
| 9 | A-9 | A | A | Example |
| 10 | A-10 | A | A | Example |
| 11 | A-11 | A | C | Example |
| 12 | B-1 | D | D | Comparative Example |
| 13 | B-2 | B | D | Comparative Example |
| 14 | B-3 | C | D | Comparative Example |
| 15 | B-5 | D | D | Comparative Example |

The invention claimed is:

1. An optical film produced by stretching a film having a low residual solvent amount in a machine direction followed by heat-treating it at a temperature falling from the glass transition point (Tg) to the melting point (Tm) thereof, which is a cellulose acylate film satisfying the following relations (1) to (6) and containing at least one cellulose acylate and at least one retardation enhancer having an absorption maximum wavelength λmax of from 280 nm to 0.380 nm:

$$35 \text{ nm} \leq Re(550) \leq 75 \text{ nm}, \quad (1)$$

$$85 \text{ nm} \leq Rth(550) \leq 140 \text{ nm}, \quad (2)$$

$$0 \text{ nm} < \Delta Re(630-450) \leq 40 \text{ nm}, \quad (3)$$

$$-75 \text{ nm} \leq \Delta Rth(630-450) < 0 \text{ nm}, \quad (4)$$

$$2.7 \leq A+B \leq 3.0, \quad (5)$$

$$B \geq 0, \quad (6)$$

wherein Re(λ) means a value of retardation in plane at a wavelength of λ nm; Rth(λ) means a value of retardation along the thickness direction at a wavelength of λ nm; ΔRe(λ$_1$–λ$_2$) means Re(λ$_1$)–Re(λ$_2$) (provided that λ$_1$>λ$_2$); ΔRth(λ$_1$–λ$_2$) means Rth(λ$_1$)–Rth(λ$_2$) (provided that λ$_1$>λ$_2$); "A" means a degree of substitution with an acetyl group of said at least one cellulose acylate, and "B" means a degree of substitution with an acyl group having at least 3 carbon atoms thereof.

2. The optical film of claim 1, which is stretched in the machine direction at a stretching ratio of less than 45%.

3. The optical film of claim 1, which is stretched in the machine direction at a stretching ratio of from 7% to 30%.

4. The optical film of claim 1, which is stretched in the machine direction at a stretching ratio of from 15% to 25%.

5. The optical film of claim 1, which satisfies the following formulae (1)' to (4)':

$$45 \text{ nm} \leq Re(550) \leq 70 \text{ nm}, \quad (1)'$$

$$90 \text{ nm} \leq Rth(550) \leq 130 \text{ nm}, \quad (2)'$$

$$3 \text{ nm} < \Delta Re(630-450) \leq 30 \text{ nm}, \quad (3)'$$

$$-50 \text{ nm} \leq \Delta Rth(630-450) < -10 \text{ nm} \quad (4)'.$$

6. The optical film of claim 1, which satisfies the following formulae (1)" to (4)':

$$50 \text{ nm} \leq Re(550) \leq 65 \text{ nm}, \quad (1)''$$

$$95 \text{ nm} \leq Rth(550) \leq 125 \text{ nm}, \quad (2)''$$

$$5 \text{ nm} < \Delta Re(630-450) \leq 20 \text{ nm}, \quad (3)''$$

$$-35 \text{ nm} \leq \Delta Rth(630-450) < -25 \text{ nm} \quad (4)''.$$

7. A polarizing plate comprising a polarizing element and an optical film of claim 1.

8. A VA-mode liquid-crystal display device comprising two polarizing plates and a liquid-crystal cell disposed between them, wherein at least one of the two polarizing plates is a polarizing plate of claim 7.

* * * * *